(12) United States Patent
Oh et al.

(10) Patent No.: US 11,550,051 B2
(45) Date of Patent: Jan. 10, 2023

(54) APPARATUS AND METHOD FOR ESTIMATING RAINFALL OF HAIL AND RAIN USING DUAL-POLARIZATION WEATHER RADAR

(71) Applicant: KOREA METEOROLOGICAL ADMINISTRATION, Seoul (KR)

(72) Inventors: Young A Oh, Seoul (KR); Mi Kyung Suk, Seoul (KR); Sung Hwa Jung, Seoul (KR); Hae Lim Kim, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 280 days.

(21) Appl. No.: 17/010,482

(22) Filed: Sep. 2, 2020

(65) Prior Publication Data
US 2021/0088653 A1    Mar. 25, 2021

(30) Foreign Application Priority Data

Sep. 25, 2019    (KR) .................. 10-2019-0118072

(51) Int. Cl.
| G01S 13/95 | (2006.01) |
| G01S 7/02 | (2006.01) |
| G01S 7/41 | (2006.01) |

(52) U.S. Cl.
CPC ............ *G01S 13/958* (2013.01); *G01S 7/025* (2013.01); *G01S 7/412* (2013.01)

(58) Field of Classification Search
CPC ...... G01S 13/951; G01S 13/958; G01S 7/025; G01S 7/412; Y02A 90/10
See application file for complete search history.

(56) References Cited

U.S. PATENT DOCUMENTS

| 10,126,424 B1 * | 11/2018 | Eilts | .................. G01W 1/14 |
| 2016/0252614 A1 * | 9/2016 | Takechi | ................ G01S 13/95 |
| | | | 342/26 R |
| 2020/0301008 A1 * | 9/2020 | Hayano | .................. G01S 7/411 |

FOREIGN PATENT DOCUMENTS

| JP | WO 2017051647 | * | 8/2016 |
| KR | 10-0931950 B1 | | 12/2009 |
| KR | 10-1255966 B1 | | 4/2013 |

* cited by examiner

*Primary Examiner* — Timothy X Pham
(74) *Attorney, Agent, or Firm* — Bridgeway IP Law Group, PLLC; Jihun Kim

(57) ABSTRACT

An apparatus and a method for estimating rainfall of hail and rain using a dual-polarization weather radar improve accuracy of classification of hail and rain zones and estimation of rainfall intensity by classifying hail and rain zones using a distribution of horizontal reflectivity and differential reflectivity of radar observation values, discriminating between a convective zone and a stratiform zone depending on reflection intensity, and applying a dual-polarization-based rainfall estimating relational equation for each type in a weighted mean technique.

19 Claims, 9 Drawing Sheets

US 11,550,051 B2

APPARATUS AND METHOD FOR ESTIMATING RAINFALL OF HAIL AND RAIN USING DUAL-POLARIZATION WEATHER RADAR

BACKGROUND OF THE INVENTION

Field of the Invention

The present invention relates to a technology for classifying hail and rain zones and estimating rainfall based on information obtained by a dual-polarization weather radar, and more specifically, to an apparatus and a method for estimating rainfall of hail and rain using a dual-polarization weather radar which improve accuracy of classification of hail and rain zones and estimation of rainfall intensity by classifying hail and rain zones using a distribution of horizontal reflectivity and differential reflectivity of radar observation values, discriminating between a convective zone and a stratiform zone depending on reflection intensity, and applying a dual-polarization-based rainfall estimating relational equation for each type in a weighted mean technique.

Description of the Related Art

In the related art, as disclosed in Korean Patent No. 10-0931950 or Korean Patent No. 10-1255966, types of precipitations are classified and a precipitation quantity is estimated by establishing a reflectivity vertical profile of a weather radar and then detecting a bright band zone.

Quantitative estimation of rainfall using the weather radar is performed by a relational equation between radar reflectivity and rainfall intensity which is generally called a Z (reflectivity)-R (rainfall intensity) relational equation. Here, in the Z-R relational equation, a regression equation between rainfall intensity and reflectivity calculated through scattering simulation using DSD data observed by a specific drop size distribution (DSD) model or a 2-dimensional video disdrometer is used.

However, since the DSD changes depending on a type of hydrometeor or a fine physical process, an error can occur due to a change in DSD, when rainfall intensity is estimated using a single rainfall estimating equation.

In addition, $Z_H = 200R^{1.6}$ (Marshall and Palmer, 1948) widely used for estimating rainfall is a relational equation suitable for stratiform rain and has a limitation in that in an example of strong precipitation in summer, it is underestimated by the relational equation.

On the other hand, a problem arises in that in a strong convective rainfall level, hail particles having various sizes can be generated, and thus very high reflectivity can be observed. That is a problem due to induction of significant overestimation, compared to an actual ground precipitation quantity, when the rainfall intensity is estimated using the Z-R relational equation. FIG. 1 is a diagram illustrating examples of distribution images of rainfall intensity (amount of rainfall per hour) (a in FIG. 1) at a specific time which is estimated by a reflectivity-rainfall intensity relational equation, as rainfall intensity based on reflectivity representing very high reflectivity of 50 dBZ or higher, hydrometeor classification (b in FIG. 1), and a distribution (c in FIG. 1) by ground rain gauges which represents an amount of rainfall per hour and shows four times an accumulated amount for 15 minutes.

In addition, a horizontal reflectivity $Z_H$-differential reflectivity $Z_{DR}$ distribution for each type of hydrometeor (precipitation particle) in the related art is a discontinuous distribution, and thus a problem arises in that it is difficult to apply the distribution to a rainfall estimating equation. FIG. 2 is a graph illustrating a discontinuous distribution (Straka and Zrnic, 1993) between horizontal reflectivity $Z_H$ differential reflectivity $Z_{DR}$ for each type of precipitation particle in the related art.

CITATION LIST

Patent Literature

Patent Literature 1: Korean Patent No. 10-0931950
Patent Literature 2: Korean Patent No. 10-1255966

SUMMARY OF THE INVENTION

The invention is made to solve the above-described problems in the related art, and objects thereof are to provide an apparatus and a method for estimating rainfall of hail and rain using a dual-polarization weather radar which improve accuracy of classification of hail and rain zones and estimation of rainfall intensity by classifying hail and rain zones using a distribution of horizontal reflectivity and differential reflectivity that are radar observation values, discriminating between a convective zone and a stratiform zone depending on reflection intensity, and applying a dual-polarization-based rainfall estimating relational equation for each type of precipitation in a weighted mean technique, in order to solve a overestimated or underestimated simulation induced from rainfall estimation using a radar in the related art.

According to an embodiment of the invention to achieve an object described above, there is provided an apparatus for estimating rainfall of hail and rain using a dual-polarization weather radar, including: a hail/rain zone classifying unit that classifies a hail zone, an entire rain zone, and a hail-rain mixed zone between the hail zone and the entire rain zone, based on zones and a mean distribution curve between horizontal reflectivity $Z_H$ and differential reflectivity $Z_{DR}$ derived from an observed raindrop size distribution, by using values of the horizontal reflectivity $Z_H$ and the differential reflectivity $Z_{DR}$ at respective observation points contained in input observation information of the dual-polarization weather radar; and a rainfall estimating unit that estimates rainfall intensity for each zone classified by the hail/rain zone classifying unit, by using observation information of horizontal reflectivity $Z_H$, differential reflectivity $Z_{DR}$, and specific differential phase $K_{DP}$.

Preferably, the hail/rain zone classifying unit is configured to classify the entire rain zone into a differential reflectivity valid rain zone containing a main rain zone and a large-raindrop zone in which the differential reflectivity is valid in estimating rainfall intensity and a differential reflectivity invalid rain zone containing a zone in which the differential reflectivity is out of a range of the main rain zone and the large-raindrop zone and is invalid in estimating the rainfall intensity and which is classified into a convective zone, a convective-stratiform transition zone, and a stratiform zone depending on reflectivity.

Preferably, the hail/rain zone classifying unit is configured to classify a zone as a main rain zone in which the differential reflectivity is usable, by setting a certain permissible width from points of the mean distribution curve between horizontal reflectivity $Z_H$ and differential reflectivity $Z_{DR}$ and classify the zone as the main rain zone by setting an upper limit obtained by increasing an amount by 15% to 25% of a value obtained by adding 0.2 dB to 0.4 dB to the curve and a lower limit obtained by decreasing an amount by 20% to 30% of a value obtained by subtracting 0.3 dB to 0.5 dB from the curve.

Preferably, the hail/rain zone classifying unit is configured to classify a zone of the zone as a large-raindrop zone in which the differential reflectivity is usable, by setting an upper limit of the large-raindrop zone by increasing an amount by 55% to 65% of a value obtained by adding 0.3 dB to 0.5 dB to a top of a main rain zone in order to consider large raindrops which are rain particles and have relatively high differential reflectivity.

Preferably, the hail/rain zone classifying unit is configured to classify, as the hail zone, a zone of the zones in which the horizontal reflectivity $Z_H$ is 40 dBZ or higher and the differential reflectivity $Z_{DR}$ is 0.3 or lower.

Preferably, the hail/rain zone classifying unit is configured to classify, as the hail-rain mixed zone in which hail and rain are mixed, a zone of the zones in which the horizontal reflectivity $Z_H$ is 40 dBZ or higher and the differential reflectivity $Z_{DR}$ is a value between an upper limit of the hail zone and a lower limit of the rain zone.

Preferably, the rainfall estimating unit is configured to estimate hail rainfall intensity of the hail zone, by $R(K_{DP})^{Hail}=\alpha K_{DP}^{\alpha}$ (10.0≤α≤35.0 and 0.5≤β≤0.8), when $K_{DP}$ (specific differential phase)>0.1°/km, and to estimate hail rainfall intensity of the hail-rain mixed zone by $R(Z_H)^{Hail}=\alpha Z_H^{\beta}$ (0.001≤α≤0.3 and 0.5≤β≤1.5), when $K_{DP}$ (specific differential phase)≤0.1°/km.

Preferably, the rainfall estimating unit is configured to estimate rainfall intensity $R(K_{DP})^{Rain}$ of the entire rain zone, by $R(K_{DP})^{Rain}=\alpha K_{DP}^{\beta}$ (35.0≤α≤75.0 and 0.8≤β≤1.5), when $Z_H$ (horizontal reflectivity)>35 dB, and the specific differential phase $K_{DP}$ which is in a range of $K_{DP}$ (specific differential phase)>0.3°/km is applied such that estimation of the rainfall intensity is valid in the entire rain zone except the hail and hail-rain mixed zones.

Preferably, the rainfall estimating unit is configured to estimate rainfall intensity $R(Z_H, Z_{DR})^{Rain}$ of a differential reflectivity $Z_{DR}$ valid zone containing a main rain zone and a large-raindrop zone, by $R(Z_H, Z_{DR})^{Rain}=\alpha Z_H^{\beta}10^{0.1\gamma}Z_{DR}$ (0.001≤α≤0.3, 0.5≤β≤1.2, and −3.0≤γ≤6.0), when the specific differential phase $K_{DP}$ is invalid in estimating the rainfall intensity, but the differential reflectivity $Z_{DR}$ is valid to be applied thereto.

Preferably, the rainfall estimating unit is configured to set convective ($Z_H$>52 dBZ) and stratiform ($Z_H$<30 dBZ) zones depending on reflectivity, regarding a zone in which 30 dBZ $Z_H$≤52 dBZ as a convective-stratiform transition zone, in a differential reflectivity $Z_{DR}$ invalid rain zone (zone in which $K_{DP}$ (specific differential phase)≤0.3°/km and except a main rain zone and a large-raindrop zone) of a rainfall intensity estimation target zone in which $K_{DP}$ (specific differential phase) and $Z_{DR}$ (differential reflectivity) as dual-polarization variables are not usable, and estimate rainfall intensity $R_{ext}^{Rain}$ of the differential reflectivity invalid rain zone by obtaining a weighted mean of rainfall intensity of a convective rain zone and a stratiform rain zone, by $R_{ext}^{Rain}=R_{conv.}(Z_H)^{Rain} \times W_{conv.}(Z_H)+R_{strt.}(Z_H)^{Rain} \times W_{strt.}(Z_H)$, here, $R_{ext}^{Rain}$ representing rainfall intensity of the differential reflectivity invalid rain zone in which the dual-polarization variables are not usable, $R_{conv.}(Z_H)^{Rain}$ being obtained by $\alpha Z_H^{\beta}$ (0.001≤α≤0.3 and 0.6≤β≤1.1) and representing rainfall intensity of the convective rain zone, $R_{strt.}(Z_H)^{Rain}$ being obtained by $\alpha Z_H^{\beta}$ (0.005≤α≤0.5 and 0.4≤β≤0.8) and representing rainfall intensity of the stratiform rain zone, $$W_{conv.}\left(\left|\frac{|Z_H^{Obs.}-Z_H^{Strt.}|}{|Z_H^{Conv.}-Z_H^{Strt.}|}\right|\right)$$

representing a convective zone weight value, and $$W_{strt.}\left(\left|\frac{|Z_H^{Obs.}-Z_H^{Conv.}|}{|Z_H^{Conv.}-Z_H^{Strt.}|}\right|\right)$$

representing a stratiform zone weight value.

Preferably, the rainfall estimating unit estimates rainfall intensity $R^{mix}$ of the hail-rain mixed zone (when observed differential reflectivity is between a lower limit of a main rain zone and an upper limit of the hail zone), by $R^{mix}=R^{Hail} \times W_{Hail}+R^{Rain} \times W_{Rain}$, as a weighted mean of rainfall intensity $R^{Rain}$ of the main rain zone and rainfall intensity $R^{Hail}$ of the hail zone, by calculating a weight value depending on a differential reflectivity value.

Preferably, depending on respective specific differential phase values, $R^{Hail}$ becomes $R(K_{DP})^{Hail}$ or $R(Z_H)^{Hail}$, and $R^{Rain}$ becomes $R(K_{DP})^{Rain}$ or $R_{ext}^{Rain}$. Preferably, $W_{Hail}$ is obtained by $$\omega_{Hail}=\frac{|Z_{DR}^{Obs.}-Z_{DR}^{Rain}(Z_H^{Obs.})|}{|Z_{DR}^{Rain}(Z_H^{Obs.})-Z_{DR}^{Hail}|}$$

as a weight value of the hail zone, and $W_{Rain}$ is obtained by $$\omega_{Rain}=\frac{|Z_{DR}^{Obs.}-Z_{DR}^{Hail}|}{|Z_{DR}^{Rain}(Z_H^{Obs.})-Z_{DR}^{Hail}|}$$

as a weight value of the rain zone, here, $Z_H^{obs}$ representing observed horizontal reflectivity, $Z_{DR}^{obs.}$ representing observed differential reflectivity, $Z_{DR}^{Rain}(Z_H^{obs.})$ representing a lower limit value of differential reflectivity $Z_{DR}$ of the main rain zone with respect to the observed horizontal reflectivity $Z_H^{obs.}$, and $Z_{DR}^{Hail}$ representing an upper limit value of differential reflectivity of the hail zone.

According to another embodiment of the invention to achieve the other object described above, there is provided a method for estimating rainfall of hail and rain using a dual-polarization weather radar which is performed by an apparatus for estimating rainfall of hail and rain using a dual-polarization weather radar which includes a hail/rain zone classifying unit and a rainfall estimating unit, the method including: a step of extracting an observation value from input observation information of the dual-polarization weather radar, by the hail/rain zone classifying unit; a hail/rain zone classifying step of classifying a hail/rain zone depending on a distribution of horizontal reflectivity $Z_H$ and differential reflectivity $Z_{DR}$ into a main rain zone and a large-raindrop zone in which differential reflectivity is usable, a hail zone, a hail-rain mixed zone, and a differential reflectivity invalid rain zone, by using information of the horizontal reflectivity $Z_H$ and the differential reflectivity $Z_{DR}$ of the extracted observation values, and classifying the differential reflectivity invalid rain zone into a convective zone, a stratiform zone, and a transition zone therebetween depending on reflection intensity, by the hail/rain zone classifying unit; and a rainfall intensity estimating step of estimating the rainfall intensity for each hail/rain zone, by using information of horizontal reflectivity $Z_H$, differential reflectivity $Z_{DR}$, and specific differential phase $K_{DP}$ observed for each zone classified in the hail/rain zone classifying step, by the rainfall estimating unit.

Preferably, the hail/rain zone classifying step is configured to include a hail zone classifying step of classifying, as the hail zone, a zone of the hail/rain zone in which the horizontal reflectivity $Z_H$ is 40 dBZ or higher and the differential reflectivity $Z_{DR}$ is 0.3 or lower, by the hail/rain zone classifying unit.

Preferably, the hail/rain zone classifying step is configured to include a hail-rain mixed zone classifying step of classifying, as the hail-rain mixed zone in which hail and rain are mixed, a zone of the hail/rain zone in which the horizontal reflectivity $Z_H$ is 40 dBZ or higher and the differential reflectivity $Z_{DR}$ is a value between an upper limit of the hail zone and a lower limit of the rain zone, by the hail/rain zone classifying unit.

Preferably, the hail/rain zone classifying step is configured to include a main rain zone classifying step of classifying a zone as a main rain zone by setting an upper limit obtained by increasing an amount by 15% to 25% of a value obtained by adding 0.2 dB to 0.4 dB to points of a mean distribution curve between horizontal reflectivity $Z_H$ and differential reflectivity $Z_{DR}$ derived from data of observed drop size distribution (DSD) and a lower limit obtained by decreasing an amount by 20% to 30% of a value obtained by subtracting 0.3 dB to 0.5 dB from the points thereof, by the hail/rain zone classifying unit.

Preferably, the hail/rain zone classifying step is configured to include a large-raindrop zone classifying step of classifying a zone as a large-raindrop zone in which the differential reflectivity is usable by setting an upper limit (increase by 60% of a value obtained by adding 0.4 dB to the curve) of the large-raindrop zone at a top of a main rain zone in order to consider large raindrops which are rain particles having a relatively large diameter and have relatively high differential reflectivity, by the hail/rain zone classifying unit.

Preferably, the rainfall intensity estimating step is configured to include an entire rain zone rainfall intensity estimating step of estimating first rainfall intensity $R(K_{DP})^{Rain}$ of the entire rain zone, by $R(K_{DP})^{Rain}=\alpha K_{DP}^{\beta}$ (35.0≤α≤75.0 and 0.8≤β≤1.5), when $Z_H$ (horizontal reflectivity)>35 dB, and $K_{DP}$ (specific differential phase)>0.3°/km in the rain zone, by the rainfall estimating unit.

Preferably, the rainfall intensity estimating step is configured to include a differential reflectivity $Z_{DR}$ valid zone rainfall intensity estimating step of estimating, by $R(Z_H, Z_{DR})^{Rain}=\alpha Z_H^{\beta} 10^{0.1\gamma Z_{DR}}$ (0.001≤α≤0.3, 0.5≤β≤1.2, and −3.0≤γ≤6.0), rainfall intensity $R(Z_H, Z_{DR})^{Rain}$ of a differential reflectivity $Z_{DR}$ valid zone of a main rain zone and a large-raindrop zone which are $Z_{DR}$ (differential reflectivity) valid zones of a zone in which the horizontal reflectivity $Z_H$ is lower than 35 dBZ or $K_{DP}$ is lower than 0.3°/km without satisfying a condition for using $K_{DP}$ (specific differential phase), by the rainfall estimating unit.

Preferably, the rainfall intensity estimating step is configured to include a differential reflectivity invalid rain zone rainfall intensity estimating step of estimating differential reflectivity invalid rain zone rainfall intensity $R_{ext}^{Rain}$ of the differential reflectivity invalid rain zone of the entire rain zone in which $Z_{DR}$ (differential reflectivity) and $K_{DP}$ (specific differential phase) as dual-polarization variables are not usable and which is out of a main rain zone and a large-raindrop zone, by $R_{ext}^{Rain} R_{conv.}(Z_H)^{Rain} \times W_{conv.}(Z_H) + R_{strt.}(Z_H)^{Rain} \times W_{strt.}(Z_H)$, by the rainfall estimating unit. Here, $R_{ext}^{Rain}$ represents rainfall intensity of the differential reflectivity $Z_{DR}$ invalid rain zone in which the dual-polarization variables are not usable, $R_{conv.}(Z_H)^{Rain}$ is $\alpha Z_H^{\beta}$ (0.001≤α≤0.3 and 0.6≤β≤1.1) and represents rainfall intensity of convective rain, $R_{strt.}(Z_H)^{Rain}$ is $\alpha Z_H^{\beta}$ (0.005≤α≤0.5 and 0.4≤β≤0.8) and represents rainfall intensity of stratiform rain, $$W_{conv.}\left(\left|\frac{|Z_H^{Obs.} - Z_H^{Strt.}|}{|Z_H^{Conv.} - Z_H^{Strt.}|}\right|\right)$$

represents a convective zone weight value, and $$W_{strt.}\left(\left|\frac{|Z_H^{Obs.} - Z_H^{Conv.}|}{|Z_H^{Conv.} - Z_H^{Strt.}|}\right|\right)$$

represents a stratiform zone weight value, $Z_H^{obs}$ representing observed horizontal reflectivity, $Z_H^{Strt.}$ representing an upper limit value of horizontal reflectivity of a stratiform rain zone, and $Z_H^{Conv.}$ representing a lower limit value of horizontal reflectivity of a convective rain zone.

Preferably, the rainfall intensity estimating step is configured to include a step of estimating, with respect to the hail zone in which the horizontal reflectivity $Z_H$ is 40 dBZ or higher, and the differential reflectivity $Z_{DR}$ is 0.3 or lower, hail rainfall intensity of the hail zone, by $R(K_{DP})^{Hail}=\alpha K_{DP}^{\beta}$ (10.0≤α≤35.0 and 0.5≤β≤0.8), when $K_{DP}$ (specific differential phase)>0.1°/km, and estimate hail rainfall intensity of the hail-rain mixed zone by $R(Z_H)^{Hail}=\alpha Z_H^{\beta}$ (0.001≤α≤0.3 and 0.5≤β≤1.5), when $K_{DP}$ (specific differential phase) ≤0.1°/km, by the rainfall estimating unit.

Preferably, the rainfall intensity estimating step includes a hail-rain mixed zone rainfall intensity estimating step of estimating hail-rain mixed zone rainfall intensity of the hail-rain mixed zone in which observed horizontal reflectivity $Z_H$ is 40 dBZ or higher and observed differential reflectivity is between a lower limit of a main rain zone and an upper limit of the hail zone, by $R^{mix}=R(Z_H)^{Hail} \times W_{Hail}(Z_H)+R^{Rain} \times W_{Rain}(Z_{DR})$ as a weighted mean of entire rain zone rainfall intensity $R(K_{DP})^{Rain}$ of the entire rain zone and rainfall intensity of the hail zone, by calculating weight values ($W_{Hail}(Z_H)$ and $W_{Rain}(Z_H)$) depending on a differential reflectivity $Z_{DR}$ value, by the rainfall estimating unit. Preferably, depending on respective specific differential phase values, $R^{Hail}$ becomes $R(K_{DP})^{Hail}$ or $R(Z_H)^{Hail}$, and $R^{Rain}$ becomes $R(K_{DP})^{Rain}$ or $R_{ext}^{Rain}$. Preferably, $W_{Hail}(Z_H)$ is obtained by $$\frac{|Z_{DR}^{Obs.} - Z_{DR}^{Rain}(Z_H^{Obs.})|}{|Z_{DR}^{Rain}(Z_H^{Obs.}) - Z_{DR}^{Hail}|}$$

as a weight value of hail of the hail-rain mixed zone, and $W_{Rain}(Z_{DR})$ is obtained by $$\frac{|Z_{DR}^{Obs.} - Z_{DR}^{Hail}|}{|Z_{DR}^{Rain}(Z_H^{Obs.}) - Z_{DR}^{Hail}|}$$

as a weight value of rain of the hail-rain mixed zone, here, $Z_H^{obs}$ representing observed horizontal reflectivity, $Z_{DR}^{obs.}$ representing observed differential reflectivity, $Z_{DR}^{Rain}$ ($Z_H^{obs.}$) representing a lower limit value of differential reflectivity $Z_{DR}$ of the main rain zone with respect to the observed horizontal reflectivity $Z_H^{obs.}$, and $Z_{DR}^{Hail}$ representing an upper limit value of differential reflectivity of the hail zone.

According to the invention, an effect of improving accuracy of classification of hail and rain zones and estimation of rainfall intensity by classifying hail and rain zones using a distribution of horizontal reflectivity and differential reflectivity, discriminating between a convective zone and a stratiform zone depending on reflection intensity, and applying a dual-polarization-based rainfall estimating relational equation for each type in a weighted mean technique.

Consequently, the invention can be applied to a basic technique essential to the Meteorological Administration, the National Emergency Management, a floodgate-related agency, the aerospace industry, and the aeronautical meteorological industry.

DETAILED DESCRIPTION OF THE PREFERRED EMBODIMENTS

Figure 1:
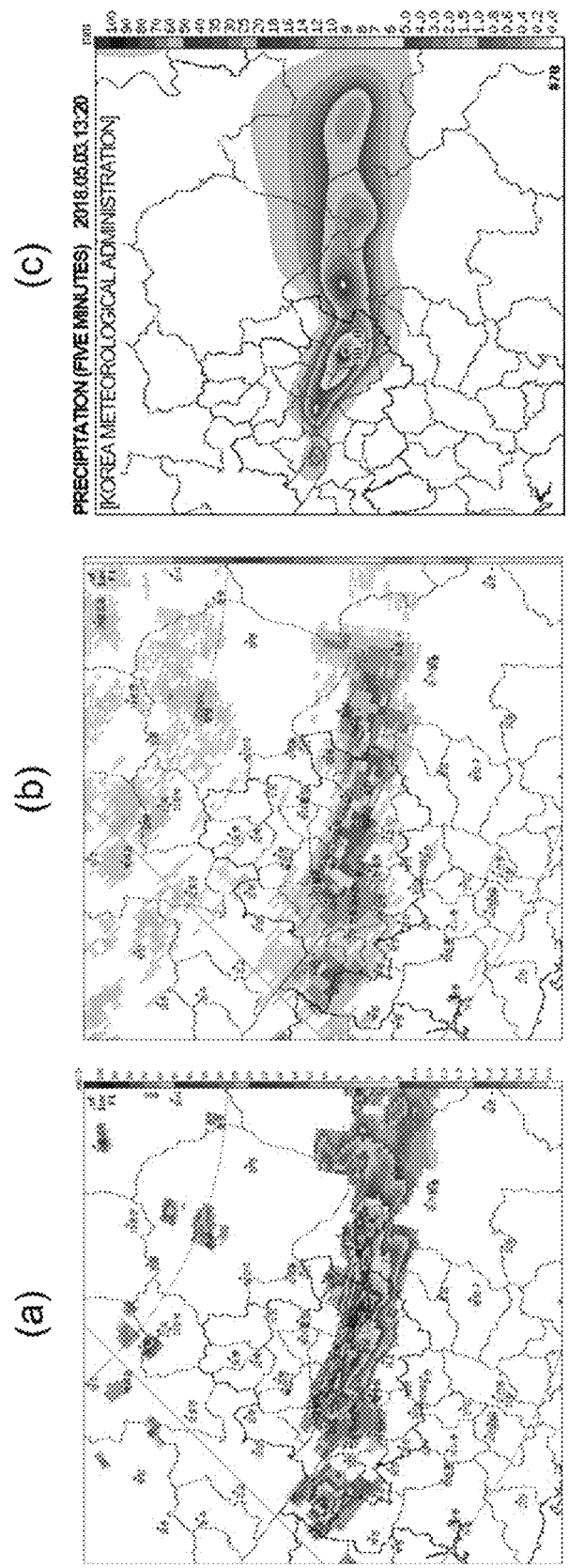
FIG. 1 is a diagram illustrating examples of images of reflection-based rainfall intensity (a in FIG. 1) of a case having very high reflectivity of 50 dBZ or higher in the related art, hydrometeor classification (b in FIG. 1), and rainfall intensity (c in FIG. 1) from ground observation.
Figure 2:
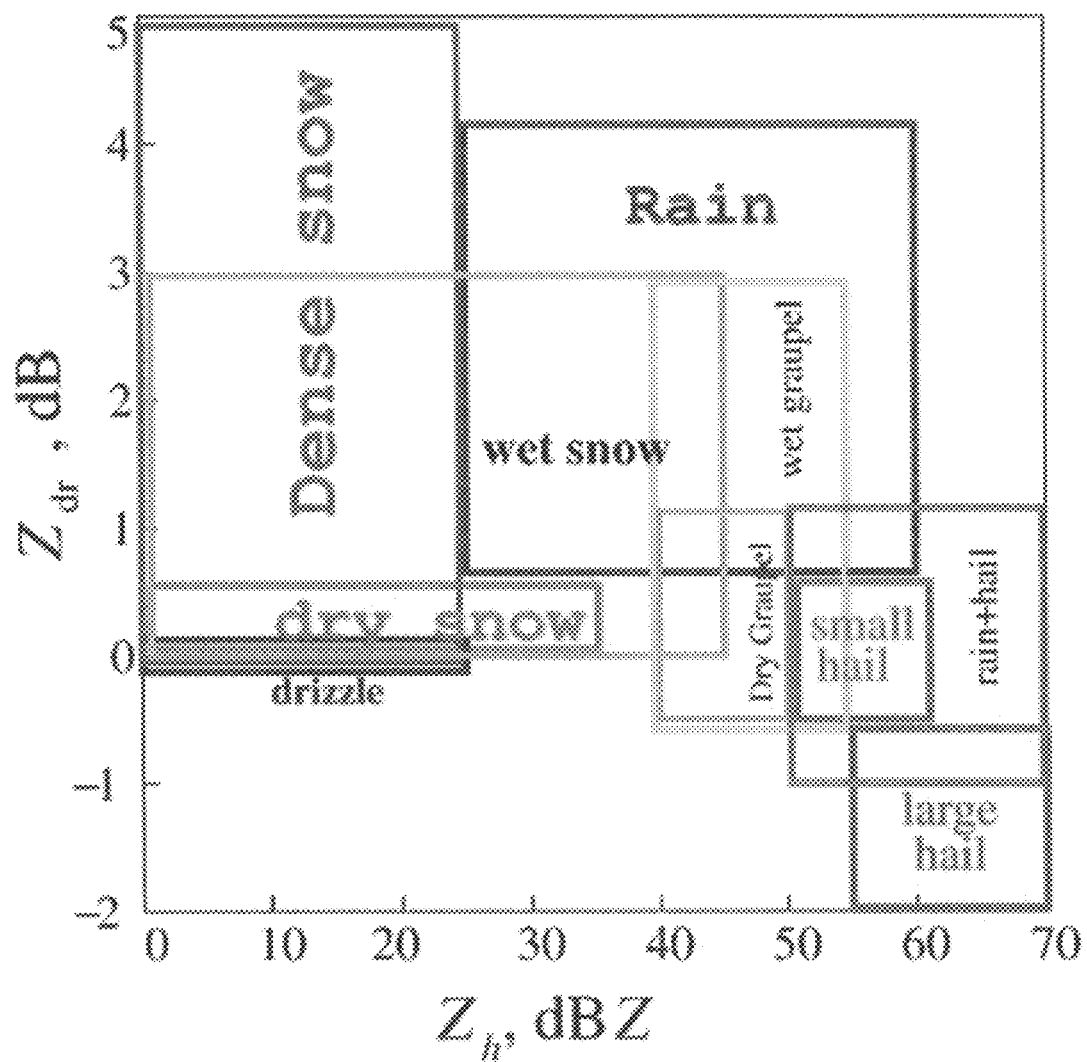
FIG. 2 is a graph illustrating a horizontal reflectivity-differential reflectivity $Z_{DR}$ distribution (Straka and Zrnic, 1993) for each type of precipitation particles in the related art.

In the following description of the invention, when detailed description of a known function or configuration in the related art is concluded to make the gist of the invention unnecessarily obscure, the detailed description thereof will be omitted.

An embodiment according to a concept of the invention can be variously modified and can have various modified examples, and thus specific embodiments are to be illustrated in the drawings and are to be described in detail in this specification or application. However, an embodiment according to a concept of the invention is not to be limited to a specific disclosed example, and the invention is construed to include every modification, equivalent, and alternative which is included in the idea and the technical scope of the invention.

When a configurational element is "coupled" or "connected" to another configurational element in the following description, the configurational element may be directly coupled or connected to the other configurational element, but the description needs to be construed as that still another configurational element can be presented between the configurational elements. On the other hand, when a configurational element is "directly coupled" or "directly connected" to another configurational element in the following description, the description needs to be construed as that no configurational element is presented between the configurational elements. Words such as "between", "directly between", "adjacent to" or "directly adjacent to" used to describe a relationship between configurational elements need to be construed in the same manner.

Terms used in this specification are only used to describe a specific embodiment and are not intentionally used to limit the invention thereto. A singular form of a word includes a plural form thereof, unless obviously implied otherwise in context. In this specification, words such as "to include" or "to have" are construed to specify that a feature, a number, a step, an operation, a configurational element, a part, or an assembly thereof provided therein is present and not to exclude presence or a possibility of addition of one or more other features, numbers, steps, operations, configurational elements, parts, or assemblies thereof in advance.

According to an embodiment of the invention to achieve an object described above, there is provided an apparatus for estimating rainfall of hail and rain using a dual-polarization weather radar, including: a hail/rain zone classifying unit that classifies a hail zone, an entire rain zone, and a hail-rain mixed zone between the hail zone and the entire rain zone, based on zones and a mean distribution curve between horizontal reflectivity $Z_H$ and differential reflectivity $Z_{DR}$ derived from an observed raindrop size distribution, by using values of the horizontal reflectivity $Z_H$ and the differential reflectivity $Z_{DR}$ at respective observation points contained in input observation information of the dual-polarization weather radar; and a rainfall estimating unit that estimates rainfall intensity for each zone classified by the hail/rain zone classifying unit, by using observation information of horizontal reflectivity $Z_H$, differential reflectivity $Z_{DR}$, and specific differential phase $K_{DP}$.

The hail/rain zone classifying unit is configured to classify the entire rain zone into a differential reflectivity valid rain zone containing a main rain zone and a large-raindrop zone in which the differential reflectivity is valid in estimating rainfall intensity and a differential reflectivity invalid rain zone containing a zone in which the differential reflectivity is out of a range of the main rain zone and the large-raindrop zone and is invalid in estimating the rainfall intensity and which is classified into a convective zone, a convective-stratiform transition zone, and a stratiform zone depending on reflectivity.

The hail/rain zone classifying unit is configured to classify a zone as a main rain zone in which the differential reflectivity is usable, by setting a certain permissible width from points of the mean distribution curve between horizontal reflectivity $Z_H$ and differential reflectivity $Z_{DR}$ and classify the zone as the main rain zone by setting an upper limit obtained by increasing an amount by 15% to 25% of a value obtained by adding 0.2 dB to 0.4 dB to the curve and a lower limit obtained by decreasing an amount by 20% to 30% of a value obtained by subtracting 0.3 dB to 0.5 dB from the curve.

The hail/rain zone classifying unit is configured to classify a zone of the zone as a large-raindrop zone in which the differential reflectivity is usable, by setting an upper limit of the large-raindrop zone by increasing an amount by 55% to 65% of a value obtained by adding 0.3 dB to 0.5 dB to a top of a main rain zone in order to consider large raindrops which are rain particles and have relatively high differential reflectivity.

The hail/rain zone classifying unit is configured to classify, as the hail zone, a zone of the zones in which the horizontal reflectivity $Z_H$ is 40 dBZ or higher and the differential reflectivity $Z_{DR}$ is 0.3 or lower.

The hail/rain zone classifying unit is configured to classify, as the hail-rain mixed zone in which hail and rain are mixed, a zone of the zones in which the horizontal reflectivity $Z_H$ is 40 dBZ or higher and the differential reflectivity $Z_{DR}$ is a value between an upper limit of the hail zone and a lower limit of the rain zone.

The rainfall estimating unit is configured to estimate hail rainfall intensity of the hail zone, by $R(K_{DP})^{Hail}=\alpha K_{DP}^{\beta}$ ($10.0 \leq \alpha \leq 35.0$ and $0.5 \leq \beta \leq 0.8$), when $K_{DP}$ (specific differential phase)$>0.1°/km$, and to estimate hail rainfall intensity of the hail-rain mixed zone by $R(Z_H)^{Hail}=\alpha Z_H^{\beta}$ ($0.001 \leq \alpha \leq 0.3$ and $0.5 \leq \beta \leq 1.5$), when $K_{DP}$ (specific differential phase) $\leq 0.1°/km$.

The rainfall estimating unit is configured to estimate rainfall intensity of the entire rain zone, that is, rainfall intensity $R(K_{DP})^{Rain}$ of the entire rain zone, by $R(K_{DP})^{Rain}=\alpha K_{DP}^{\beta}$ ($35.0 \leq \alpha \leq 75.0$ and $0.8 \leq \beta \leq 1.5$), when $Z_H$ (horizontal reflectivity)$>35$ dB, and the specific differential phase $K_{DP}$ which is in a range of $K_{DP}$ (specific differential phase)$>0.3°/km$ is applied such that estimation of the rainfall intensity is valid in the entire rain zone except the hail and hail-rain mixed zones.

The rainfall estimating unit is configured to estimate, as rainfall intensity of a differential reflectivity $Z_{DR}$ valid zone, rainfall intensity $R(Z_H, Z_{DR})^{Rain}$ of a differential reflectivity valid zone containing a main rain zone and a large-raindrop zone, by $R(Z_H, Z_{DR})^{Rain}=\alpha Z_H^{\beta} 10^{0.1\gamma Z_{DR}}$ ($0.001 \leq \alpha \leq 0.3$, $0.5 \leq \beta \leq 1.2$, and $-3.0 \leq \gamma \leq 6.0$), when the specific differential phase $K_{DP}$ is invalid in estimating the rainfall intensity, but the differential reflectivity $Z_{DR}$ is valid to be applied thereto.

The rainfall estimating unit is configured to set convective ($Z_H>52$ dBZ) and stratiform ($Z_H<30$ dBZ) zones depending on reflectivity, regarding a zone in which 30 dBZ$\leq Z_H \leq 52$ dBZ as a convective-stratiform transition zone, in a differential reflectivity $Z_{DR}$ invalid rain zone (zone in which $K_{DP}$ (specific differential phase)$\leq 0.3°/km$ and except a main rain zone and a large-raindrop zone) of a rainfall intensity estimation target zone in which $K_{DP}$ (specific differential phase) and $Z_{DR}$ (differential reflectivity) as dual-polarization variables are not usable, and estimate rainfall intensity $R_{ext}R^{Rain}$ of the differential reflectivity invalid rain zone by obtaining a weighted mean of rainfall intensity of a convective rain zone and a stratiform rain zone, by $R_{ext}^{Rain}= R_{conv.}(Z_H)^{Rain} \times W_{conv.}(Z_H) + R_{strt.}(Z_H)^{Rain} \times W_{strt.}(Z_H)$, here, $R_{ext}^{Rain}$ representing rainfall intensity of the differential reflectivity invalid rain zone in which the dual-polarization variables are not usable, $R^{conv.}(Z_H)^{Rain}$ being obtained by $\alpha Z_H^{\beta}$ ($0.001 \leq \alpha \leq 0.3$ and $0.6 \leq \beta \leq 1.1$) and representing rainfall intensity of the convective rain zone, $R_{strt.}(Z_H)^{Rain}$ being obtained by $\alpha Z_H^{\beta}$ ($0.005 \leq \alpha \leq 0.5$ and $0.4 \leq \beta \leq 0.8$) and representing rainfall intensity of the stratiform rain zone, $$W_{conv.}\left(\left|\frac{|Z_H^{Obs.}-Z_H^{Strt.}|}{|Z_H^{Conv.}-Z_H^{Strt.}|}\right|\right)$$

representing a convective zone weight value, and $$W_{strt.}\left(\left|\frac{|Z_H^{Obs.}-Z_H^{Conv.}|}{|Z_H^{Conv.}-Z_H^{Strt.}|}\right|\right)$$

representing a stratiform zone weight value.

The rainfall estimating unit estimates rainfall intensity $R^{mix}$ of the hail-rain mixed zone (when observed differential reflectivity is between a lower limit of a main rain zone and an upper limit of the hail zone), by $R^{mix}=R^{Hail} \times W_{Hail} + R^{Rain} \times W_{Rain}$, as a weighted mean of rainfall intensity $R^{Rain}$ of the main rain zone and rainfall intensity $R^{Hail}$ of the hail zone, by calculating a weight value depending on a differential reflectivity value. Depending on respective specific differential phase values, $R^{Hail}$ becomes $R(K_{DP})^{Hail}$ or $R(Z_H)^{Hail}$, and $R^{Rain}$ becomes $R(K_{DP})^{Rain}$ or $R_{ext}^{Rain}$. $W_{Hail}$ is obtained by $$\omega_{Hail} = \frac{|Z_{DR}^{Obs.}-Z_{DR}^{Rain}(Z_H^{Obs.})|}{|Z_{DR}^{Rain}(Z_H^{Obs.})-Z_{DR}^{Hail}|}$$

as a weight value of the hail zone, and $W_{Rain}$ is obtained by $$\omega_{Rain} = \frac{|Z_{DR}^{Obs.}-Z_{DR}^{Hail}|}{|Z_{DR}^{Rain}(Z_H^{Obs.})-Z_{DR}^{Hail}|}$$

as a weight value of the rain zone, here, $Z_H^{obs.}$ representing observed horizontal reflectivity, $Z_{DR}^{obs.}$ representing observed differential reflectivity, $Z_{DR}^{Rain}(Z_H^{obs.})$ representing a lower limit value of differential reflectivity $Z_{DR}$ of the main rain zone with respect to the observed horizontal reflectivity $Z_H^{obs.}$, and $Z_{DR}^{Hail}$ representing an upper limit value of differential reflectivity of the hail zone.

According to another embodiment of the invention to achieve the other object described above, there is provided a method for estimating rainfall of hail and rain using a dual-polarization weather radar which is performed by an apparatus for estimating rainfall of hail and rain using a dual-polarization weather radar which includes a hail/rain zone classifying unit and a rainfall estimating unit, the method including: a step of extracting an observation value from input observation information of the dual-polarization weather radar, by the hail/rain zone classifying unit; a hail/rain zone classifying step of classifying a hail/rain zone depending on a distribution of horizontal reflectivity $Z_H$ and differential reflectivity $Z_{DR}$ into a main rain zone and a large-raindrop zone in which differential reflectivity is usable, a hail zone, a hail-rain mixed zone, and a differential reflectivity invalid rain zone, by using information of the horizontal reflectivity $Z_H$ and the differential reflectivity $Z_{DR}$ of the extracted observation values, and classifying the differential reflectivity invalid rain zone into a convective zone, a stratiform zone, and a transition zone therebetween depending on reflection intensity, by the hail/rain zone classifying unit; and a rainfall intensity estimating step of estimating the rainfall intensity for each hail/rain zone, by using information of horizontal reflectivity $Z_H$, differential reflectivity $Z_{DR}$, and specific differential phase $K_{DP}$ observed for each zone classified in the hail/rain zone classifying step, by the rainfall estimating unit.

The hail/rain zone classifying step is configured to include a hail zone classifying step of classifying, as the hail zone, a zone of the hail/rain zone in which the horizontal reflectivity $Z_H$ is 40 dBZ or higher and the differential reflectivity $Z_{DR}$ is 0.3 or lower, by the hail/rain zone classifying unit.

The hail/rain zone classifying step is configured to include a hail-rain mixed zone classifying step of classifying, as the hail-rain mixed zone in which hail and rain are mixed, a zone of the hail/rain zone in which the horizontal reflectivity $Z_H$ is 40 dBZ or higher and the differential reflectivity $Z_{DR}$ is a value between an upper limit of the hail zone and a lower limit of the rain zone, by the hail/rain zone classifying unit.

The hail/rain zone classifying step is configured to include a main rain zone classifying step of classifying a zone as a main rain zone by setting an upper limit obtained by increasing an amount by 15% to 25% of a value obtained by adding 0.2 dB to 0.4 dB to points of a mean distribution curve between horizontal reflectivity $Z_H$ and differential reflectivity $Z_{DR}$ derived from data of observed drop size distribution (DSD) and a lower limit obtained by decreasing an amount by 20% to 30% of a value obtained by subtracting 0.3 dB to 0.5 dB from the points thereof, by the hail/rain zone classifying unit.

The hail/rain zone classifying step is configured to include a large-raindrop zone classifying step of classifying a zone as a large-raindrop zone in which the differential reflectivity is usable by setting an upper limit (increase by 60% of a value obtained by adding 0.4 dB to the curve) of the large-raindrop zone at a top of a main rain zone in order to consider large raindrops which are rain particles having a relatively large diameter and have relatively high differential reflectivity, by the hail/rain zone classifying unit.

The rainfall intensity estimating step is configured to include an entire rain zone rainfall intensity estimating step of estimating first rainfall intensity $R(K_{DP})^{Rain}$ of the entire rain zone, by $R(K_{DP})^{Rain} = \alpha K_{DP}^{\beta}$ ($35.0 \leq \alpha \leq 75.0$ and $0.8 \leq \beta \leq 1.5$), when $Z_H$ (horizontal reflectivity)>35 dB, and $K_{DP}$ (specific differential phase)>0.3°/km in the rain zone, by the rainfall estimating unit.

The rainfall intensity estimating step is configured to include a differential reflectivity $Z_{DR}$ valid zone rainfall intensity estimating step of estimating, by $R(Z_H, Z_{DR})^{Rain} = \alpha Z_H^{\beta} 10^{0.1 \gamma Z_{DR}}$ ($0.001 \leq \alpha \leq 0.3$, $0.5 \leq \beta \leq 1.2$, and $-3.0 \leq \gamma \leq 6.0$), rainfall intensity $R(Z_H, Z_{DR})^{Rain}$ of a differential reflectivity $Z_{DR}$ valid zone of a main rain zone and a large-raindrop zone which are $Z_{DR}$ (differential reflectivity) valid zones of a zone in which the horizontal reflectivity $Z_H$ is lower than 35 dBZ or $K_{DP}$ is lower than 0.3°/km without satisfying a condition for using $K_{DP}$ (specific differential phase), by the rainfall estimating unit.

The rainfall intensity estimating step is configured to include a differential reflectivity invalid rain zone rainfall intensity estimating step of estimating differential reflectivity invalid rain zone rainfall intensity $R_{ext}^{Rain}$ of the differential reflectivity invalid rain zone of the entire rain zone in which $Z_{DR}$ (differential reflectivity) and $K_{DP}$ (specific differential phase) as dual-polarization variables are not usable and which is out of a main rain zone and a large-raindrop zone, by $R_{ext}^{Rain} = R_{conv.}(Z_H)^{Rain} \times W_{conv.}(Z_H) + R_{strt.}(Z_H)^{Rain} \times W_{strt.}(Z_H)$, by the rainfall estimating unit. Here, $R_{ext}^{Rain}$ represents rainfall intensity of the differential reflectivity $Z_{DR}$ invalid rain zone in which the dual-polarization variables are not usable, $R_{conv.}(Z_H)^{Rain}$ is $\alpha Z_H^{\beta}$ ($0.001 \leq \alpha \leq 0.3$ and $0.6 \leq \beta \leq 1.1$) and represents rainfall intensity of convective rain, $R_{strt.}(Z_H)^{Rain}$ is $\alpha Z_H^{\beta}$ ($0.005 \leq \alpha \leq 0.5$ and $0.4 \leq \beta \leq 0.8$) and represents rainfall intensity of stratiform rain, $$W_{conv.}\left(\left|\frac{|Z_H^{Obs.} - Z_H^{Strt.}|}{|Z_H^{Conv.} - Z_H^{Strt.}|}\right|\right)$$

represents a convective zone weight value, and $$W_{strt.}\left(\left|\frac{|Z_H^{Obs.} - Z_H^{Conv.}|}{|Z_H^{Conv.} - Z_H^{Strt.}|}\right|\right)$$

represents a stratiform zone weight value, $Z_H^{obs}$ representing observed horizontal reflectivity, $Z_H^{Strt.}$ representing an upper limit value of horizontal reflectivity of a stratiform rain zone, and $Z_H^{Conv.}$ representing a lower limit value of horizontal reflectivity of a convective rain zone.

The rainfall intensity estimating step is configured to include a step of estimating, with respect to the hail zone in which the horizontal reflectivity $Z_H$ is 40 dBZ or higher, and the differential reflectivity $Z_{DR}$ is 0.3 or lower, hail rainfall intensity of the hail zone, by $R(K_{DP})^{Hail} = \alpha K_{DP}^{\beta}$ ($10.0 \leq \alpha \leq 35.0$ and $0.5 \leq \beta \leq 0.8$), when $K_{DP}$ (specific differential phase)>0.1°/km, and estimate hail rainfall intensity of the hail-rain mixed zone by $R(Z_H)^{Hail} = \alpha Z_H^{\beta}$ ($0.001 \leq \alpha \leq 0.3$ and $0.5 \leq \beta \leq 1.5$), when $K_{DP}$ (specific differential phase) $\leq 0.1$°/km, by the rainfall estimating unit.

The rainfall intensity estimating step includes a hail-rain mixed zone rainfall intensity estimating step of estimating hail-rain mixed zone rainfall intensity of the hail-rain mixed zone in which observed horizontal reflectivity $Z_H$ is 40 dBZ or higher and observed differential reflectivity is between a lower limit of a main rain zone and an upper limit of the hail zone, by $R^{mix} = R(Z_H)^{Hail} \times W_{Hail}(Z_H) + R^{Rain} \times W_{Rain}(Z_{DR})$ as a weighted mean of entire rain zone rainfall intensity $R(K_{DP})^{Rain}$ of the entire rain zone and rainfall intensity ($R(K_{DP})^{Hail}$ or $R(Z_H)^{Hail}$) of the hail zone, by calculating weight values ($W_{Hail}(Z_H)$ and $W_{Rain}(Z_H)$) depending on a differential reflectivity $Z_{DR}$ value, by the rainfall estimating unit.

$W_{Hail}(Z_H)$ is obtained by $$\frac{|Z_{DR}^{Obs.} - Z_{DR}^{Rain}(Z_H^{Obs.})|}{|Z_{DR}^{Rain}(Z_H^{Obs.}) - Z_{DR}^{Hail}|}$$

as a weight value of hail of the hail-rain mixed zone, and $W_{Rain}(Z_{DR})$ is obtained by $$\frac{|Z_{DR}^{Obs.} - Z_{DR}^{Hail}|}{|Z_{DR}^{Rain}(Z_H^{Obs.}) - Z_{DR}^{Hail}|}$$

as a weight value of rain of the hail-rain mixed zone, here, $Z_H^{obs}$ representing observed horizontal reflectivity, $Z_{DR}^{obs.}$ representing observed differential reflectivity, $Z_{DR}^{Rain}(Z_H^{obs.})$ representing a lower limit value of differential reflectivity $Z_{DR}$ of the main rain zone with respect to the observed horizontal reflectivity $Z_H^{obs.}$, and $Z_{DR}^{Hail}$ representing an upper limit value of differential reflectivity of the hail zone. Depending on respective specific differential phase values, $R^{Hail}$ and $R^{Rain}$ become $R(K_{DP})^{Hail}$ or $R(Z_H)^{Hail}$ and $R(K_{DP})^{Rain}$ or $R_{ext}^{Rain}$, respectively.

In the equations for calculating rainfall intensity of the invention described above, α and β represent a coefficient and an index for a regression equation of rainfall intensity values and radar variables (horizontal reflectivity, differential reflectivity, and differential phase) obtained by simulation through a scattering simulation algorithm using observation data of drop size distribution which has been collected and accumulated for a long period. Consequently, α and β can vary depending on a fine physical process of a rain gauge and a zone and a period in which data of drop size distribution is observed.

Hereinafter, the invention will be described in more detail with reference to the accompanying drawings illustrating embodiments of the invention.

In the following description of the embodiments of the invention, a main rain zone 2a and a large-raindrop zone 2b except a hail zone and a hail-rain mixed zone are defined as a 'differential reflectivity valid rain zone'.

The main rain zone 2a, the large-raindrop zone 2b, a differential reflectivity valid rain zone 2, and a differential reflectivity invalid rain zone 3 except the hail zone and the hail-rain mixed zone are defined as an 'entire rain zone'.

An entire zone including the entire rain zone, the hail zone, and the hail-rain mixed zone is defined as an 'entire rainfall intensity estimation target zone'.

In addition, in the embodiments of the invention, there is provided description of the following embodiments in which hail rainfall intensity of the hail zone is estimated by $R(K_{DP})^{Hail}=29.01K_{DP}^{0.77}$, when $K_{DP}$ (specific differential phase)>0.1°/km, and hail rainfall intensity of the hail-rain mixed zone is estimated by $R(Z_H)^{Hail}=0.017K_{DP}^{0.714}$, when $K_{DP}$ (specific differential phase)≤0.1°/km.

There is provided description of an example in which rainfall intensity $R^{Rain}$ of the entire rain zone is estimated by $R(K_{DP})^{Rain}=44.63K_{DP}^{0.854}$, when $Z_H$ (horizontal reflectivity)>35 dB, and the specific differential phase $K_{DP}$ which is in a range of $K_{DP}$ (specific differential phase)>0.3°/km is applied such that estimation of the rainfall intensity is valid in the entire rain zone except the hail and hail-rain mixed zones.

There is provided description of an example in which rainfall intensity $R(Z_H, Z_{DR})^{Rain}$ of a differential reflectivity valid zone containing the main rain zone and the large-raindrop zone is estimated as rainfall intensity of a differential reflectivity $Z_{DR}$ valid zone, by $R(Z_H, Z_{DR})^{Rain}=0.0121Z_H^{0.88}10^{0.1(-4.3645)Z_{DR}}$, when the specific differential phase $K_{DP}$ is invalid in estimating the rainfall intensity, but the differential reflectivity $Z_{DR}$ is valid to be applied thereto.

There is provided description of an example in which convective ($Z_H$>52 dBZ) and stratiform ($Z_H$<30 dBZ) zones are set depending on reflectivity, a zone in which 30 dBZ≤$Z_H$≤52 dBZ is regarded as a convective-stratiform transition zone, in a differential reflectivity $Z_{DR}$ invalid rain zone (zone in which $K_{DP}$ (specific differential phase)≤0.3°/km and except the main rain zone and the large-raindrop zone) of the rainfall intensity estimation target zone in which $K_{DP}$ (specific differential phase) and $Z_{DR}$ (differential reflectivity) as dual-polarization variables are not usable, and rainfall intensity $R_{ext}^{Rain}$ of the differential reflectivity invalid rain zone is estimated by obtaining a weighted mean of rainfall intensity of the convective rain zone and the stratiform rain zone, by $R_{ext}^{Rain}=R_{conv.}(Z_H)^{Rain} \times W_{conv.}(Z_H)+R_{strt.}(Z_H)^{Rain} \times W_{strt.}(Z_H)$, here, $R_{ext}^{Rain}$ representing rainfall intensity of the differential reflectivity invalid rain zone in which the dual-polarization variables are not usable, $R_{conv.}(Z_H)^{Rain}=0.01Z_H^{0.833}$ representing rainfall intensity of the convective rain zone, $R_{strt.}(Z_H)^{Rain}=0.0365Z_H^{0.625}$ representing rainfall intensity of the stratiform rain zone, $$W_{conv.}\left(\left|\frac{|Z_H^{Obs.}-Z_H^{Strt.}|}{|Z_H^{Conv.}-Z_H^{Strt.}|}\right|\right)$$

representing a convective zone weight value, and $$W_{strt.}\left(\left|\frac{|Z_H^{Obs.}-Z_H^{Conv.}|}{|Z_H^{Conv.}-Z_H^{Strt.}|}\right|\right)$$

representing a stratiform zone weight value.

Figure 3:
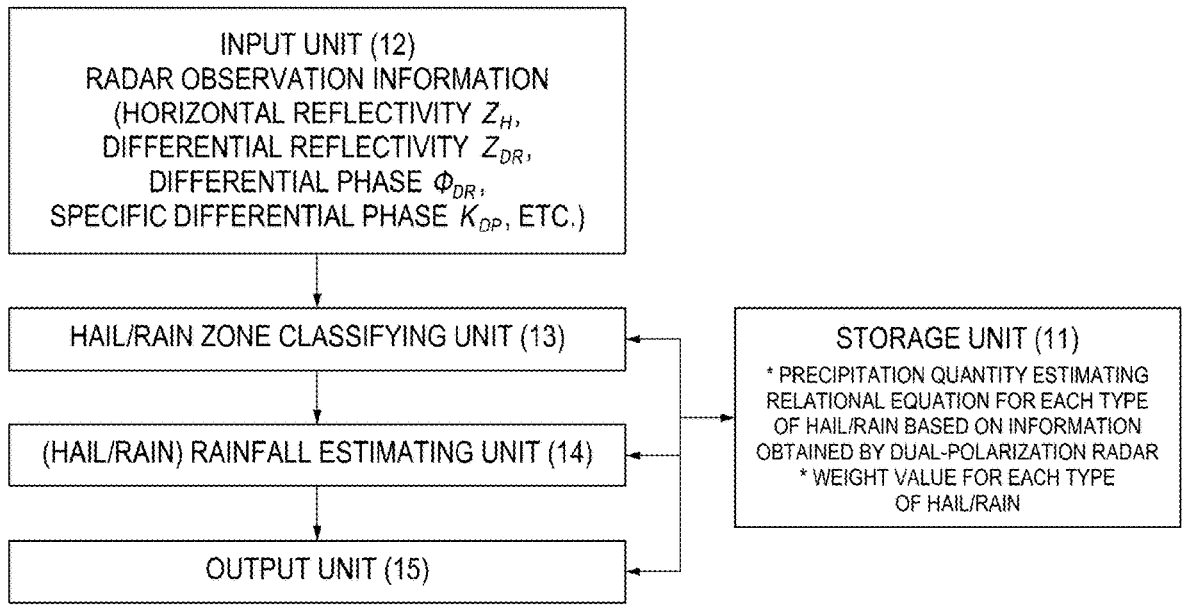
FIG. 3 is a diagram illustrating a functional block configuration of an apparatus for estimating rainfall of hail and rain using a dual-polarization radar according to an embodiment of the invention.

FIG. 3 is a diagram illustrating a functional block configuration of an apparatus 10 for estimating rainfall of hail and rain using a dual-polarization radar (hereinafter, referred to as "hail/rain rainfall estimating apparatus 10") of an embodiment of the invention.

As illustrated in FIG. 3, the hail/rain rainfall estimating apparatus 10 can be configured to include a storage unit 11, an input unit 12, a hail/rain zone classifying unit 13, a rainfall estimating unit 14, and an output unit 15.

The storage unit 11 is configured of a storage device that stores information for estimating rainfall of hail and rain, the information containing a relational equation for estimating rainfall of hail and rain, reflectivity of the hail and rain zones, and a range (upper limit (value) and lower limit (value)) of distribution of the differential reflectivity based on observation information of a dual-polarization weather radar.

The input unit 12 is configured of an input device such as a data reader, a data input/output port, a keypad, or a communication port for inputting data online, the input device enabling observation information of a dual-polarization weather radar to be input, the information containing information of horizontal reflectivity $Z_H$, differential reflectivity $Z_{DR}$, differential phase $\Phi_{DP}$, specific differential phase $K_{DP}$, correlation coefficient ρhv, or the like. The observation information of the dual-polarization weather radar input through the input unit 12 is stored in the storage unit 11. The observation information of the dual-polarization radar contains actual observation information and observation information stored for a long period in the past.

The hail/rain zone classifying unit 13 extracts observation values including items of information of horizontal reflectivity $Z_H$ and differential reflectivity $Z_{DR}$ from the input observation information of the dual-polarization weather radar and then classifies types of rainfall for observation locations such that a relational equation for each zone can be applied, by using the hail and rain zones divided based on preceding research by Straka and Zrmic (1993) and a mean distribution curve between horizontal reflectivity $Z_H$ and differential reflectivity $Z_{DR}$ derived from observed DSD. A method for causing the hail/rain zone classifying unit 13 to classify a differential reflectivity valid rain zone containing the main rain zone and the large-raindrop zone, the hail-rain mixed zone and the differential reflectivity invalid rain zone 3, and the differential reflectivity invalid rain zone and a stratiform zone 6, a convective-stratiform transition zone 7, and a stratiform zone 8 divided in the differential reflectivity invalid rain zone 3 depending on reflectivity will be described in more detail in the description of the method for estimating rainfall of hail and rain using observation information of a dual-polarization weather radar of the invention.

The hail/rain rainfall estimating unit 14 is configured to estimate rainfall intensity for each zone classified by the hail/rain zone classifying unit 13, by using values of the horizontal reflectivity $Z_H$, the differential reflectivity $Z_{DR}$, and the specific differential phase $K_{DP}$ which are the input observation information of the dual-polarization weather radar. At that point, estimation of the rainfall intensity of hail and rain is performed by applying a dual-polarization-based rainfall estimating relational equation for each zone in a weighted mean technique and is described in more detail in the description of the method for estimating rainfall of hail and rain using observation information of a dual-polarization weather radar of the invention.

The output unit 15 is to display a driving state of the hail/rain rainfall estimating apparatus 10 and can be configured to include a monitor, a printer, a communication device that performs transmission to the outside, or the like. The output unit 15 is configured to display, output, or transmit, to the outside, observation information of a dual-polarization weather radar which is input through the input unit 12, results of zone classification of the hail/rain zone classifying unit 13, information of rainfall intensity estimated by the hail/rain rainfall estimating unit 14, or the like.

Hereinafter, processes of the method for estimating rainfall of hail and rain of another embodiment of the invention will be described in detail with reference to FIGS. 4 to 7.

Figure 4:
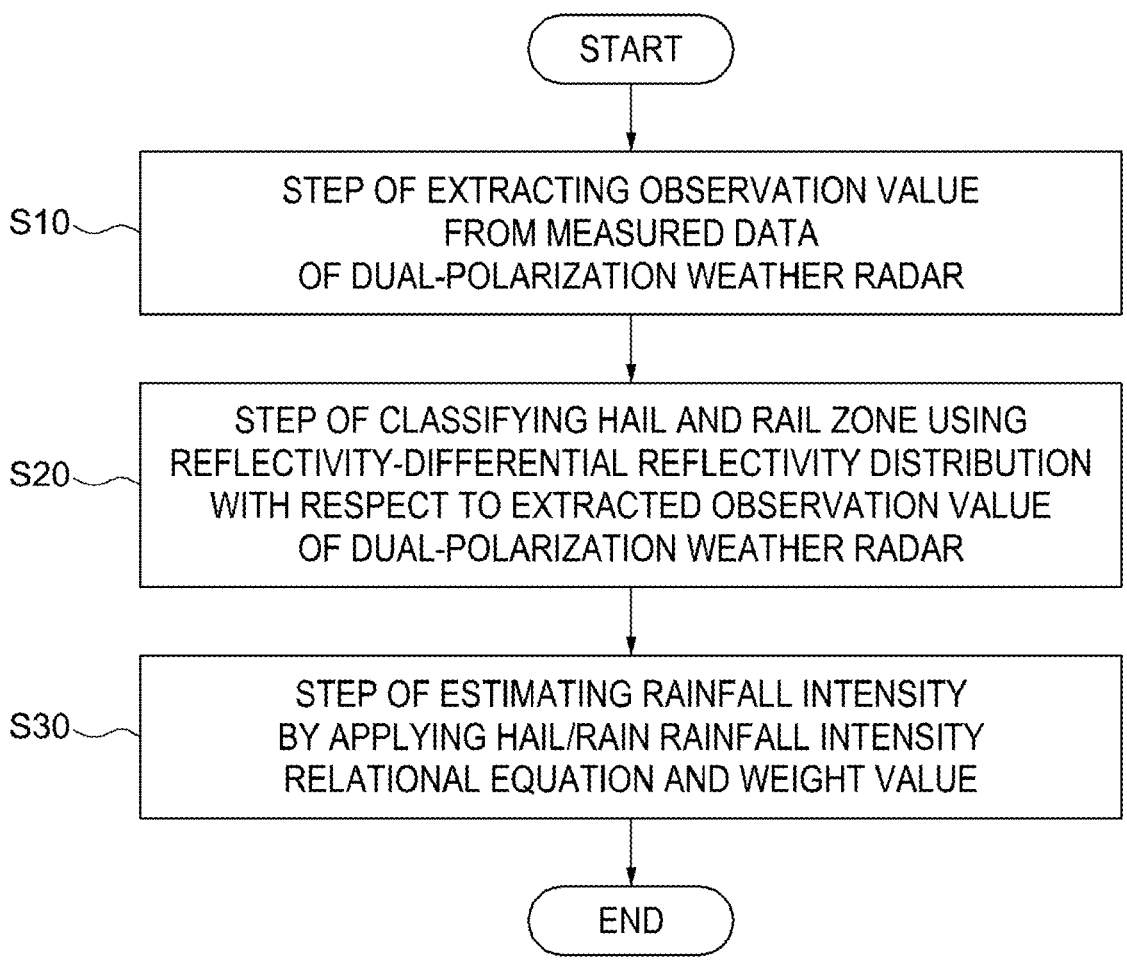
FIG. 4 is a flowchart illustrating processes of a method for estimating rainfall of hail and rain using a dual-polarization radar according to another embodiment of the invention.
Figure 5:
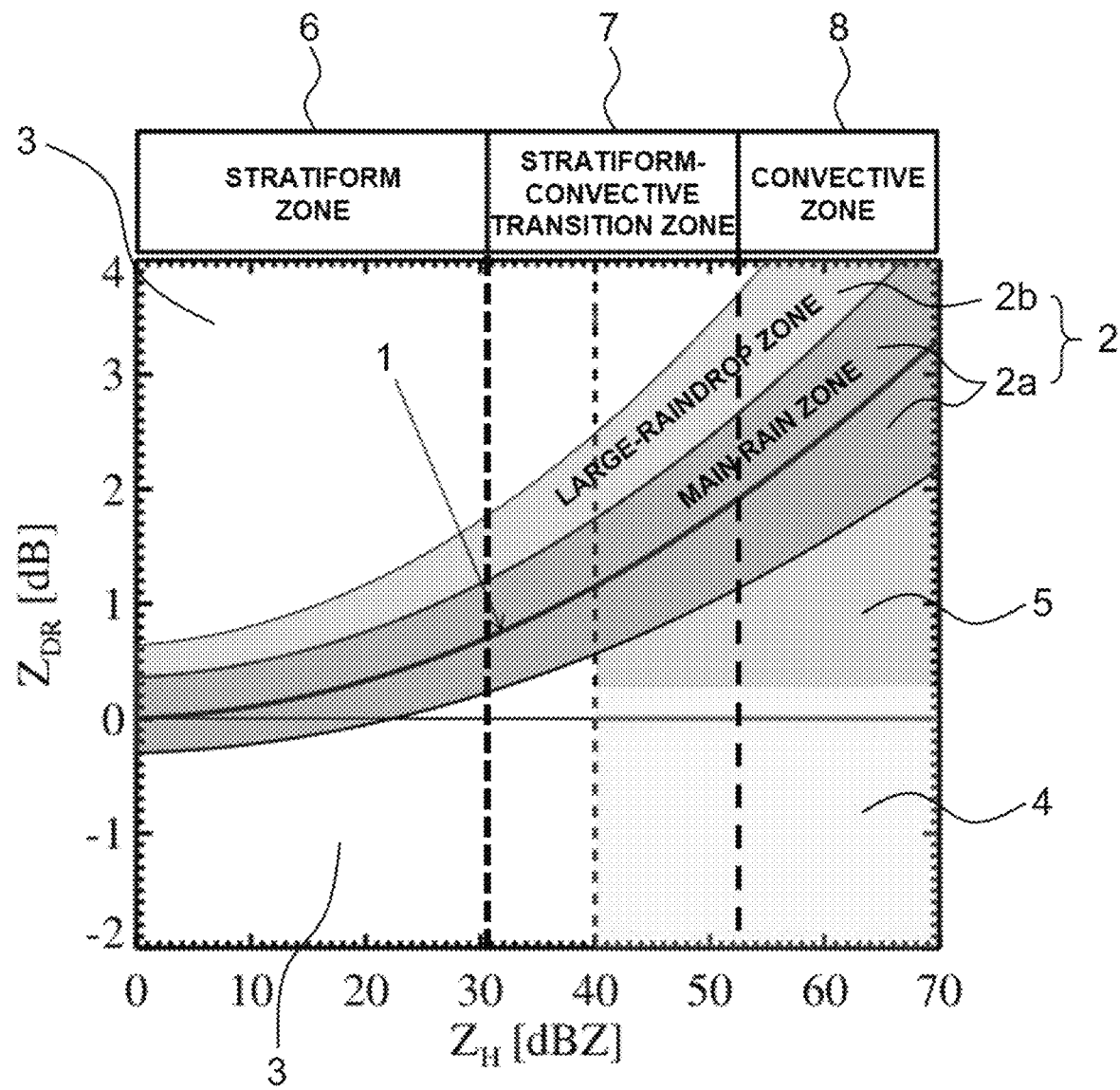
FIG. 5 is a graph illustrating hail/rain zones on horizontal reflectivity $Z_H$-differential reflectivity $Z_{DR}$ and stratiform-convective zones depending on reflectivity according to the embodiment of the invention.
Figure 6:
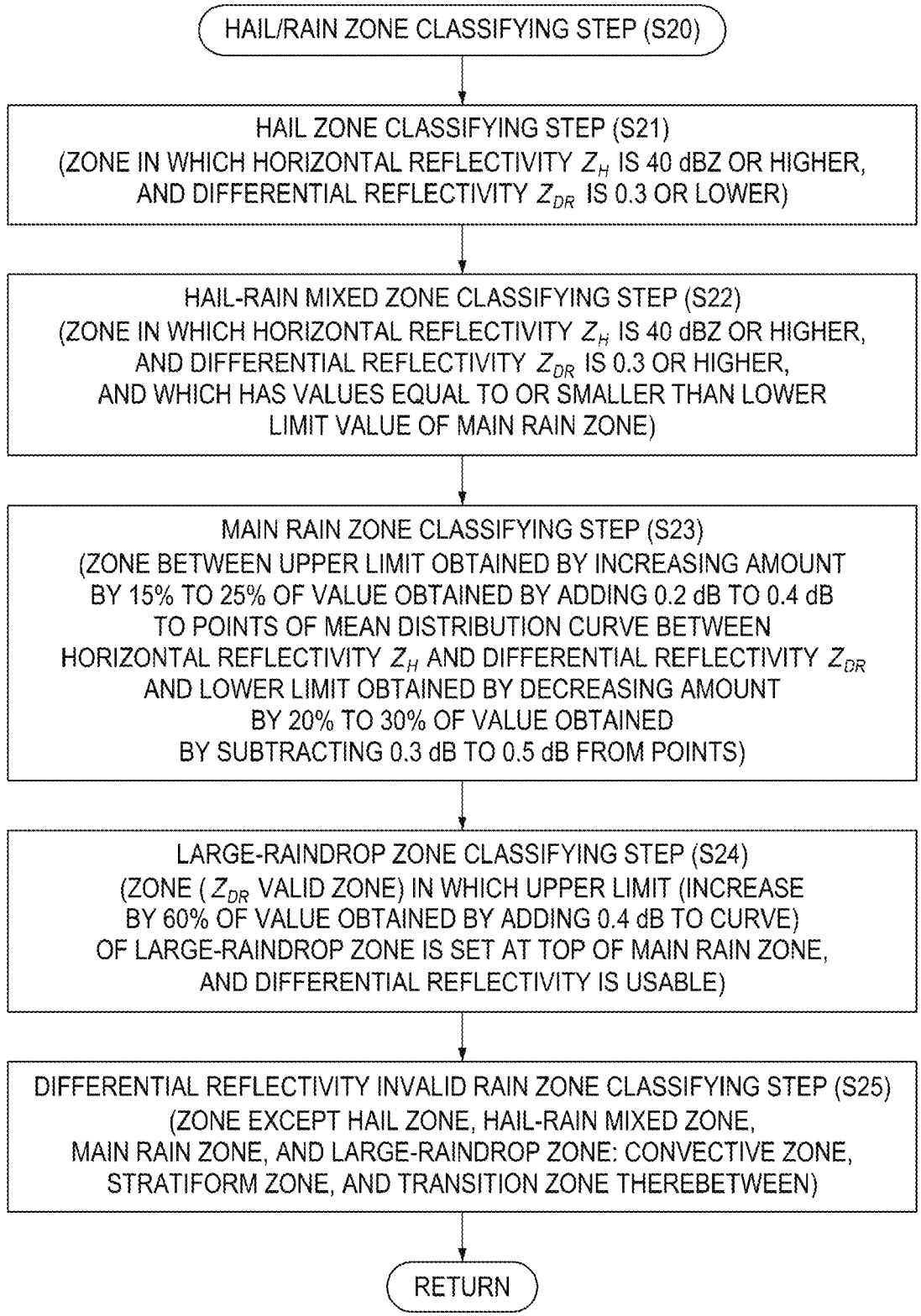
FIG. 6 is a flowchart illustrating detailed processes of a hail/rain zone classifying step of the processes in FIG. 4.

FIG. 4 is a flowchart illustrating processes of the method for estimating rainfall of hail and rain using a dual-polarization radar (hereinafter, referred to as "hail/rain rainfall estimating method") of the other embodiment of the invention, FIG. 5 is a graph illustrating regions for types of precipitation such as hail/rain zones formed on horizontal reflectivity $Z_H$ and differential reflectivity $Z_{DR}$ and stratiform-convective zones depending on reflectivity which are used in the above-described hail/rain zone classifying step S20 of the invention, and FIG. 6 is a flowchart illustrating detailed processes of the hail/rain zone classifying step S20 of the processes in FIG. 4.

As illustrated in FIG. 4, the hail/rain rainfall estimating method is configured to include a step S10 of extracting observation values from actual observation information of a dual-polarization weather radar, the hail/rain zone classifying step S20, and a rainfall intensity estimating step S30 of estimating rainfall intensity for each zone.

Specifically, after information of the dual-polarization weather radar is input through the input unit 12, the hail/rain zone classifying unit 13 executes the observation value extracting step S10 of extracting observation values from the actual observation information of the dual-polarization weather radar. At that point, the information of the dual-polarization weather radar contains observation variables of the dual-polarization weather radar such as horizontal reflectivity $Z_H$, differential reflectivity $Z_{DR}$, differential phase $\Phi_{DR}$, specific differential phase $K_{DP}$, or correlation coefficient $\rho hv$. Then, in the observation value extracting step S10, the hail/rain zone classifying unit 13 executes the hail/rain zone classifying step S20 of classifying hail and rain zones on a distribution of the horizontal reflectivity $Z_H$ and the differential reflectivity $Z_{DR}$ divided in advance in the storage unit 11, by using observation information of the horizontal reflectivity $Z_H$ and the differential reflectivity $Z_{DR}$ of the observation variables of the dual-polarization weather radar.

The hail/rain zone classifying step S20 is described in detail with reference to FIGS. 5 and 6.

As illustrated in FIG. 5, the hail/rain zone classifying unit 13 executes the hail/rain zone classifying step S20, and thereby in a region on a distribution graph between the distribution of horizontal reflectivity $Z_H$ and the differential reflectivity $Z_{DR}$, an observed zone is classified into the differential reflectivity valid rain zone 2 containing the main rain zone 2a and the large-raindrop zone 2b, the differential reflectivity invalid rain zone 3, a hail zone 4, and a hail-rain mixed zone 5 therebetween in which hail and rain are mixed, and the differential reflectivity invalid rain zone 3 is classified into the stratiform zone 6, the stratiform-convective transition zone 7, and the convective zone 8 depending on the horizontal reflectivity $Z_H$.

FIG. 5 illustrates precipitation zones classified by the hail/rain rainfall estimating apparatus 10 to which the hail/rain rainfall estimating method of this application is applied, using the horizontal reflectivity $Z_H$ and the differential reflectivity $Z_{DR}$.

In FIG. 5, a mean distribution curve 1 between the horizontal reflectivity $Z_H$ and the differential reflectivity $Z_{DR}$ indicates a mean distribution relationship between horizontal reflectivity $Z_H$ and differential reflectivity $Z_{DR}$ derived using observation data of a 2-dimensional video disdrometer (2DVD) for a long period (for example, five years or longer).

Besides, in the differential reflectivity valid rain zone 2, reflectivity and the differential reflectivity $Z_{DR}$ mostly have a proportional relationship to each other in which as reflectivity increases, the differential reflectivity $Z_{DR}$ increases, and a distribution also concentrates around a solid line of the curve 1 in the actual observation of the dual-polarization weather radar. The hail/rain zone classifying unit 13 is configured to classify an entire zone, which is a rainfall estimation target around the mean distribution curve 1 between the horizontal reflectivity $Z_H$ and the differential reflectivity $Z_{DR}$, into the differential reflectivity valid rain zone 2 containing the main rain zone 2a having preset differential reflectivity $Z_{DR}$ and the large-raindrop zone 2b having differential reflectivity $Z_{DR}$ higher than the preset differential reflectivity, the differential reflectivity invalid rain zone 3, the hail zone 4, and the hail-rain mixed zone 5 such that the hail/rain zone classifying unit executes the hail/rain zone classifying step S20.

Here, the main rain zone 2a, the large-raindrop zone 2b, the differential reflectivity valid rain zone 2, and the differential reflectivity invalid rain zone 3 except the hail zone and the hail-rain mixed zone are defined as the entire rain zone. In addition, the entire zone including the entire rain zone, the hail zone, and the hail-rain mixed zone is defined as the entire rainfall intensity estimation target zone. Hence, as illustrated in FIG. 6, the hail/rain zone classifying step S20 is configured to include a hail zone classifying step S21, a hail-rain mixed zone classifying step S22, a main rain zone classifying step S23, a large-raindrop zone classifying step S24, and a differential reflectivity invalid rain zone classifying step S25.

Specifically, the hail zone 4 is classified in the hail zone classifying step S21 of classifying, as the hail zone, a zone of the hail/rain zone in which the horizontal reflectivity $Z_H$ is 40 dBZ or higher and the differential reflectivity $Z_{DR}$ is 0.3 or lower based on the preceding research by Straka and Zrnic (1993), the step S21 being executed by the hail/rain zone classifying unit 13.

The hail-rain mixed zone 5 is classified in the hail-rain mixed zone classifying step S22 of classifying, as the hail-rain mixed zone 5, a zone in which the horizontal reflectivity $Z_H$ is 40 dBZ or higher and the differential reflectivity $Z_{DR}$ is a value between an upper limit of the hail zone and a lower limit of the rain zone of the distribution between the horizontal reflectivity $Z_H$ and the differential reflectivity $Z_{DR}$, the step S22 being executed by the hail/rain zone classifying unit 13.

The main rain zone 2a is a part of the differential reflectivity valid zone and is classified in the main rain zone classifying step S23 of classifying the main rain zone as a zone that has an upper limit obtained by increasing an amount by 15% to 25% of a value obtained by adding 0.2 dB to 0.4 dB to points of the mean distribution curve between the horizontal reflectivity $Z_H$ and the differential reflectivity $Z_{DR}$ derived from data of observed drop size distribution (DSD), has a lower limit obtained by decreasing an amount by 20% to 30% of a value obtained by subtracting 0.3 dB to 0.5 dB from the points thereof, and has the mean distribution curve between the horizontal reflectivity $Z_H$ and the differential reflectivity $Z_{DR}$, the step S23 being executed by the hail/rain zone classifying unit 13. Desirably, the main rain zone 2a classified by the main rain zone classifying step can be classified as a zone that contains the mean distribution curve between the horizontal reflectivity $Z_H$ and the differential reflectivity $Z_{DR}$ by setting an upper limit obtained by increasing an amount by 20% of a value obtained by adding 0.3 dB to the points of mean distribution curve between the horizontal reflectivity $Z_H$ and the differential reflectivity $Z_{DR}$ and a lower limit obtained by decreasing an amount by 25% of a value obtained by subtracting 0.4 dB from the points thereof.

The large-raindrop zone 2b is also a part of the differential reflectivity valid zone and is classified by the large-raindrop zone classifying step S24 of classifying a zone as the large-raindrop zone in which the differential reflectivity is usable by setting an upper limit (increase by 50% to 70% of a value obtained by adding 0.3 dB to 0.5 dB to the curve) of the large-raindrop zone at a top of the main rain zone in order to consider large raindrops which are rain particles having a relatively large diameter and have relatively high differential reflectivity, the step S24 being executed by the hail/rain zone classifying unit 13. Desirably, the large-raindrop zone 2b can be classified as a zone that corresponds to an upper portion of the main rain zone according to a mean distribution between the horizontal reflectivity $Z_H$ and the differential reflectivity $Z_{DR}$ by setting an upper limit obtained by increasing an amount by 60% of a value obtained by adding 0.4 dB to the points of the mean distribution curve between the horizontal reflectivity $Z_H$ and the differential reflectivity $Z_{DR}$ and a lower limit at the upper limit of the main rain zone.

A total zone of the main rain zone 2a and the large-raindrop zone 2b described above is classified as the differential reflectivity valid rain zone 2.

Besides, a zone out of the zone containing the main rain zone 2a and the large-raindrop zone 2b and except the hail zone 4 and the hail-rain mixed zone 5 is classified as the differential reflectivity invalid rain zone 3.

Figure 7:
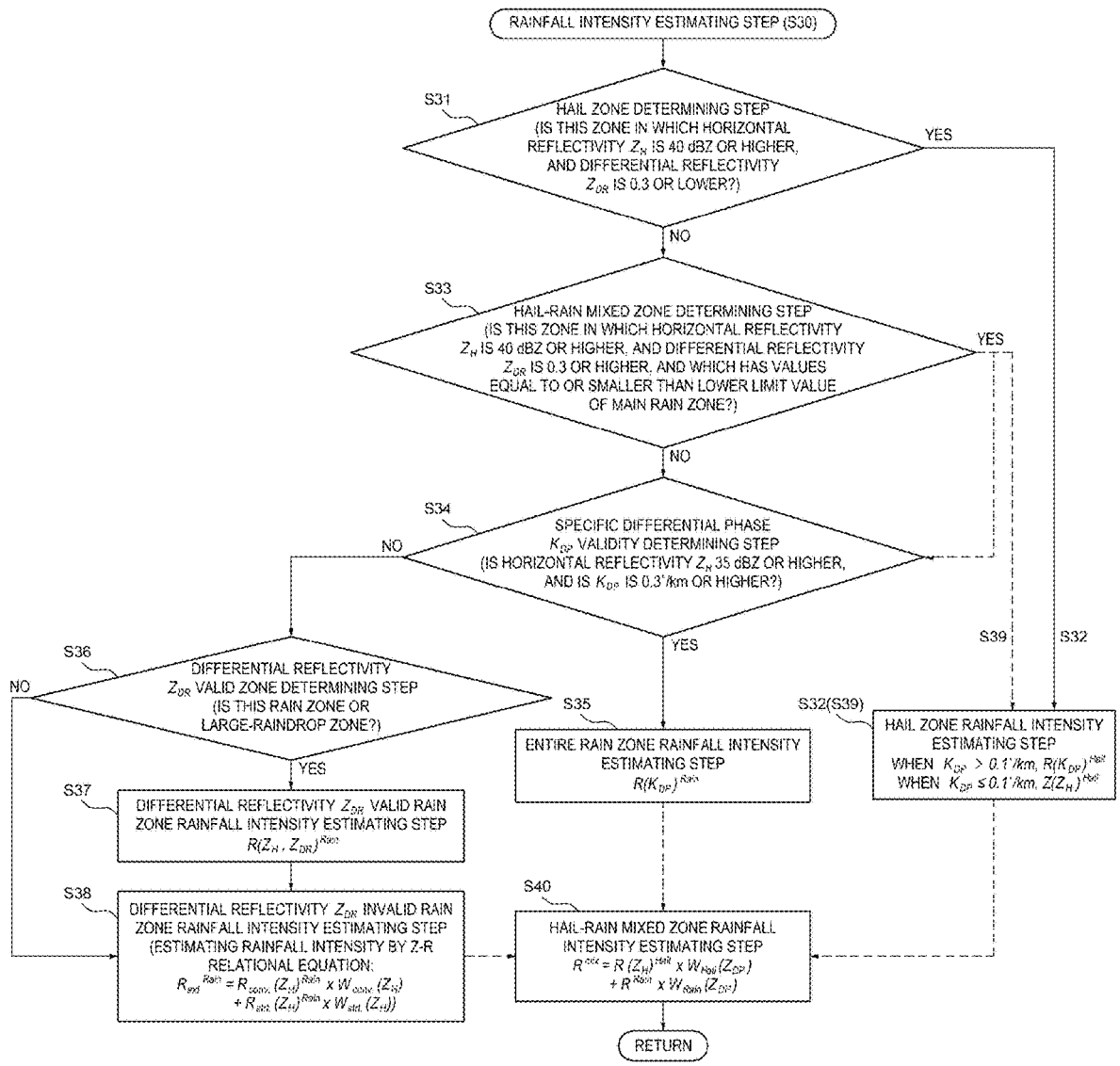
FIG. 7 is a flowchart illustrating detailed processes of a rainfall intensity estimating step in FIG. 4.

As described above, after the hail/rain zone classifying step S20 is executed and the entire rainfall estimation target zone is classified on a mean distribution graph between the horizontal reflectivity $Z_H$ and the differential reflectivity $Z_{DR}$, the rainfall intensity estimating step S30 having processes illustrated in FIG. 7 is executed by the rainfall estimating unit 14, and rainfall intensity for each type of rainfall is estimated for the entire rainfall estimation target zone.

The rainfall intensity estimating step S30 executed by the rainfall estimating unit 14 is described as follows in more detail with reference to FIG. 7.

As illustrated in FIG. 7, the rainfall intensity estimating step S30 is configured to include a hail zone determining step S31, a hail zone rainfall intensity estimating step S32 or S39, a hail-rain mixed zone determining step S33, a specific differential phase $K_{DP}$ validity determining step S34, an entire rain zone rainfall intensity estimating step S35, a differential reflectivity $Z_{DR}$ valid zone determining step S36, a differential reflectivity $Z_{DR}$ valid rain zone rainfall intensity estimating step S37, a differential reflectivity $Z_{DR}$ invalid rain zone rainfall intensity estimating step S38, and a hail-rain mixed zone rainfall intensity estimating step S40. When rainfall intensity is estimated by executing the rainfall intensity estimating step S30 having a configuration described above, the rainfall intensity is estimated by first applying the specific differential phase $K_{DP}$ used in estimating rainfall intensity with high accuracy, then applying the horizontal reflectivity $Z_H$ and the differential reflectivity $Z_{DR}$ to the differential reflectivity $Z_{DR}$ valid zone in which application of the specific differential phase $K_{DP}$ is invalid, and applying a Z-R relational equation to be described below in a case of the differential reflectivity $Z_{DR}$ invalid zone.

Specifically, the rainfall estimating unit 14 executes the hail zone determining step S31 of determining whether the rainfall intensity estimation target zone is the hail zone 4 as a zone in which the differential reflectivity $Z_{DR}$ is 0.3 dB or lower, of a zone in which the horizontal reflectivity $Z_H$ is 40 dBZ or higher on the pregenerated distribution graph between the horizontal reflectivity $Z_H$ and the differential reflectivity $Z_{DR}$.

When the rainfall intensity estimation target zone is determined as the hail zone as a result of the hail zone determining step S31, the hail zone rainfall intensity estimating step S32 of estimating rainfall intensity of the hail zone by using an equation of $R(K_{DP})=29.01 K_{DP}^{0.77}$, when the specific differential phase $K_{DP}$ is higher than 0.1°/km, and by using an equation of $R(Z_H)^{Hail}=0.01 K_{DP}^{0.714}$, when the specific differential phase $K_{DP}$ is 0.1°/km or lower.

On the other hand, when the rainfall intensity estimation target zone is determined not to be the hail zone as a result of the hail zone determining step S31, the rainfall intensity estimation target zone is checked whether to be in a range in which the specific differential phase $K_{DP}$ and the differential reflectivity $Z_{DR}$ can be used for estimating the rainfall intensity when the rainfall intensity estimation target zone is the hail-rain mixed zone or the differential reflectivity $Z_{DR}$ valid rain zone, and then the specific differential phase $K_{DP}$ or the differential reflectivity $Z_{DR}$ is applied to estimation of the rainfall intensity depending on availability thereof.

Specifically, the rainfall estimating unit executes the hail-rain mixed zone determining step S33 of determining whether the rainfall intensity estimation target zone is the hail-rain mixed zone in which hail and rain are mixed, and the horizontal reflectivity $Z_H$ is 40 dBZ or higher and the differential reflectivity $Z_{DR}$ is a value between the upper limit of the hail zone and the lower limit of the rain zone on the distribution graph between the horizontal reflectivity $Z_H$ and the differential reflectivity $Z_{DR}$.

When the rainfall intensity estimation target zone is determined not to be the hail-rain mixed zone as a result of the hail-rain mixed zone determining step S33, the rainfall estimating unit executes the specific differential phase $K_{DP}$ validity determining step S34 of determining whether estimation of the rainfall intensity of the entire rain zone with the specific differential phase $K_{PD}$ is valid, with respect to the rainfall intensity estimation target zone in which $Z_H$ (horizontal reflectivity)>35 dB, and $K_{DP}$ (specific differential phase)>0.3°/km on the pregenerated distribution graph between the horizontal reflectivity $Z_H$ and the differential reflectivity $Z_{DR}$.

When application of the specific differential phase $K_{PD}$ is determined to be valid in estimating the rainfall intensity as a result of determination by the specific differential phase $K_{DP}$ validity determining step S34, the rainfall estimating unit executes the entire rain zone rainfall intensity estimating step S35 of estimating the rainfall intensity $R(K_{DP})^{Rain}$ of the entire rain zone, by $R(K_{DP})^{Rain}=44.63K_{DP}^{0.854}$, and entire rain zone rainfall intensity of the entire rain zone (differential reflectivity valid rain zone (main rain zone and large-raindrop zone) and differential reflectivity invalid rain zone) is estimated.

The specific differential phase $K_{DP}$ validity determining step S34 is executed, because a rainfall intensity estimating relational equation in which the specific differential phase $K_{DP}$ that is a phase-based variable having the smallest rainfall estimation error in theory is first used for the entire rain zone except the hail and hail-rain mixed zones is used; however, the specific differential phase is calculated by computing an inclination from an observed differential phase, and thus a limitation arises in that calculation accuracy decreases when rainfall intensity is low or observation quality of the differential phase is low. Consequently, when application of the specific differential phase KPD is valid in estimating the rainfall intensity as $Z_H$ (horizontal reflectivity)>35 dB and $K_{DP}$ (specific differential phase)>0.3°/km, the rainfall intensity $R^{Rain}$ of the entire rain zone is estimated by $R(K_{DP})^{Rain}=44.63K_{DP}^{0.854}$, by applying the specific differential phase $K_{DP}$.

Next, when application of the specific differential phase $K_{PD}$ is determined not to be valid in estimating the rainfall intensity as a result of determination by the specific differential phase $K_{DP}$ validity determining step S34, the rainfall estimating unit executes, as an alternative, the differential reflectivity $Z_{DR}$ valid zone determining step S36 of determining whether the rainfall intensity estimation target zone is the differential reflectivity $Z_{DR}$ valid zone in which the differential reflectivity $Z_{DR}$ is between the lower limit value of the main rain zone and the upper limit value of the large-raindrop zone and can be applied to estimation of the rainfall intensity.

When the rainfall intensity estimation target zone is determined to be the differential reflectivity $Z_{DR}$ valid zone including the main rain zone 2a and the large-raindrop zone 2b in which the differential reflectivity $Z_{DR}$ can be applied to estimation of rainfall as a result of determination by the differential reflectivity $Z_{DR}$ valid zone determining step S36, the rainfall estimating unit executes the differential reflectivity $Z_{DR}$ valid rain zone rainfall intensity estimating step S37 of estimating the rainfall intensity by an equation of $R(Z_H, Z_{DR})^{Rain}=0.0121Z_H^{0.88}10^{0.1(-4.3645)Z_{DR}}$, and the differential reflectivity $Z_{DR}$ valid rain zone rainfall intensity is estimated.

On the other hand, when the rainfall intensity estimation target zone is determined to be the differential reflectivity $Z_{DR}$ invalid rain zone in which the differential reflectivity $Z_{DR}$ is not applicable to estimation of rainfall, other than the $Z_{DR}$ valid zone including the main differential reflectivity $Z_{DR}$ valid zone including the main rain zone 2a and the large-raindrop zone 2b as a result of determination by the differential reflectivity $Z_{DR}$ valid zone determining step S36, the rainfall estimating unit executes the differential reflectivity $Z_{DR}$ invalid rain zone rainfall intensity estimating step S38 of estimating the rainfall intensity by a Z-R relational equation only by using reflectivity by regarding the rainfall intensity estimation target zone as a zone in which the rainfall intensity can be estimated only by using the reflectivity, and the differential reflectivity $Z_{DR}$ invalid rain zone rainfall intensity is estimated.

Specifically, in the differential reflectivity $Z_{DR}$ invalid rain zone rainfall intensity estimating step S38, the rainfall estimating unit 34 uses the following rainfall estimation equation of $R_{ext}^{Rain}$ for calculating weighted mean rainfall intensity by using a weight value of stratiform rainfall (<30 dBZ), convective rainfall (>52 dBZ), and stratiform-convective transition rainfall therebetween depending on a degree of reflectivity.

$$R_{ext}^{Rain}=R_{conv.}(Z_H)^{Rain} \times W_{conv.}(Z_H)+R_{strt.}(Z_H)^{Rain} \times W_{strt}(Z_H)$$

Here, $R_{ext}^{Rain}$ represents rainfall intensity of the rain zone in which values of the specific differential phase $K_{DP}$ and the differential reflectivity $Z_{DR}$ are invalid, $R_{conv.}(Z_H)^{Rain}$ is $0.01Z_H^{0.833}$ and represents rainfall intensity of the convective rain which is estimated by the horizontal reflectivity $Z_H$, $R_{strt.}(Z_H)^{Rain}$ is $0.0365Z_H^{0.625}$ and represents rainfall intensity of the stratiform rain which is estimated by the horizontal reflectivity $Z_H$, $$W_{conv.}\left(\left|\frac{|Z_H^{Obs.}-Z_H^{Strt.}|}{|Z_H^{Conv.}-Z_H^{Strt.}|}\right|\right)$$

represents a convective zone weight value, and $$W_{strt}\left(\left|\frac{|Z_H^{Obs.}-Z_H^{Conv.}|}{|Z_H^{Conv.}-Z_H^{Strt.}|}\right|\right)$$

represents a stratiform zone weight value.

By returning back to the hail-rain mixed zone determining step S33, when the rainfall intensity estimation target zone is determined to be the hail-rain mixed zone in which the differential reflectivity $Z_{DR}$ is equal to or lower than a lower limit of the differential reflectivity of the main rain zone and is 0.3 dB or higher as a result of determination by the hail-rain mixed zone determining step S33, the rainfall estimating unit executes the hail-rain mixed zone rainfall intensity estimating step S40 and estimates the rainfall intensity of the hail-rain mixed zone.

Specifically, the rainfall estimating unit 14 estimates rainfall intensity $R^{Rain}$ of the main rain zone and the large-raindrop zone by $R(Z_H, Z_{DR})^{Rain}=0.0121Z_H^{0.88}10^{0.1(-4.3645)}Z_{DR}$, with $K_{DP}$ (specific differential phase)≤0.3°/km. Here, a general relational equation of Z-R in a form of $R(Z_H, Z_{DR})$ is described as $\alpha Z_H^\beta 10^{0.1\gamma Z_{DR}}$, and a γ value is expressed as $10^{0.1(-4.3645)}$.

In addition, the rainfall estimating unit 14 estimates the rainfall intensity of the differential reflectivity invalid rain zone in which the specific differential phase and the differential reflectivity are not valid, of the rain zone, by $R_{ext}^{Rain}=R_{conv.}(Z_H)^{Rain} \times W_{conv.}(Z_H)+R_{strt.}(Z_H)^{Rain} \times W_{strt.}(Z_H)$. Here, $R_{ext}^{Rain}$ represents rainfall intensity of the rain zone in which dual-polarization observation values are invalid, $R_{conv.}(Z_H)^{Rain}$ is $0.01Z_H^{0.833}$ and represents rainfall intensity of the convective rain, $R_{strt.}(Z_H)^{Rain}$ is $0.0365Z_H^{0.625}$ and represents rainfall intensity of the stratiform rain, $$W_{conv.}\left(\frac{|Z_H^{Obs.} - Z_H^{Strt.}|}{|Z_H^{Conv.} - Z_H^{Strt.}|}\right)$$

represents a convective zone weight value, and $$W_{strt}\left(\frac{|Z_H^{Obs.} - Z_H^{Conv.}|}{|Z_H^{Conv.} - Z_H^{Strt.}|}\right)$$

represents a stratiform zone weight value. $Z_H^{obs}$ represents observed horizontal reflectivity, $Z_H^{Strt.}$ represents an upper limit value of horizontal reflectivity of the stratiform rain zone, and $Z_H^{Conv.}$ represents a lower limit value of horizontal reflectivity of the convective rain zone.

In addition, the rainfall estimating unit 14 estimates hail zone rainfall intensity of the hail zone, by $R(K_{DP})^{Hail}=29.01K_{DP}^{0.77}$, when $K_{DP}$ (specific differential phase)>0.1°/km, and estimates hail zone rainfall intensity by $R(Z_H)^{Hail}=0.017K_{DP}^{0.714}$, when $K_{DP}$ (specific differential phase)≤0.1°/km.

Subsequently, the rainfall estimating unit 14 estimates rainfall intensity $R^{mix}$ of the hail-rain mixed zone (when the horizontal reflectivity $Z_H$ is 40 dBZ or higher, and observed differential reflectivity is between the lower limit of the main rain zone and the upper limit of the hail zone), by $R^{mix}=R(Z_H)^{Hail}\times W_{Hail}(Z_{DR})+R^{Rain}\times W_{Rain}(Z_{DR})$, as a weighted mean of rainfall intensity $R^{Rain}$ of the rain zone and rainfall intensity $R^{Hail}$ of the hail zone, by calculating a weight value depending on a differential reflectivity value.

Here, $R^{mix}$ represents rainfall intensity of the hail-rain mixed zone, $R_{ext}^{Rain}$ represents rainfall intensity of the differential reflectivity $Z_{DR}$ invalid rain zone, $Z_H^{obs}$ represents observation value of horizontal reflectivity, $$W_{Hail}\left(\omega_{Hail} = \frac{|Z_{DR}^{Obs.} - Z_{DR}^{Rain}(Z_H^{Obs.})|}{|Z_{DR}^{Rain}(Z_H^{Obs.}) - Z_{DR}^{Hail}|}\right)$$

represents a hail weight value of the hail-rain mixed zone, and $$W_{Rain}\left(\omega_{Rain} = \frac{|Z_{DR}^{Obs.} - Z_{DR}^{Hail}|}{|Z_{DR}^{Rain}(Z_H^{Obs.}) - Z_{DR}^{Hail}|}\right)$$

represents a weight value of rain of the hail-rain mixed zone, here, $Z_{DR}^{obs.}$ representing observed differential reflectivity, $Z_{DR}^{Rain}(Z_H^{obs.})$ representing a lower limit value of differential reflectivity $Z_{DR}$ of the rain zone with respect to the observed horizontal reflectivity $Z_H^{obs}$ of the hail-rain mixed zone, and $Z_{DR}^{Hail}$ representing an upper limit value of differential reflectivity of the hail zone. In addition, depending on respective specific differential phase values, $R^{Hail}$ and $R^{Rain}$ become $R(K_{DP})^{Hail}$ or $R(Z_H)^{Hail}$ and $R(K_{DP})^{Rain}$ or $R_{ext}^{Rain}$, respectively. The convective zone weight value, the stratiform zone weight value, the hail zone weight value, and the mixed zone weight value indicate a degree of similarity to the stratiform rain, the convective rain, rain-like rain, or hail-like rain.

A rain type and the estimated rainfall intensity generated in the processes of FIGS. 4 and 7 described above are output through the output unit 15, and then the processes are ended.

EMBODIMENTS

Results of rainfall estimation of the related art and the invention are compared by using radar observatory, an image of dual-polarization hydrometeor classification based on statistics, and an image of ground rainfall in a hail case of the north of Gyeongbuk Province on Jun. 1, 2017, in order to measure performance of the invention of this application.

Figure 8:
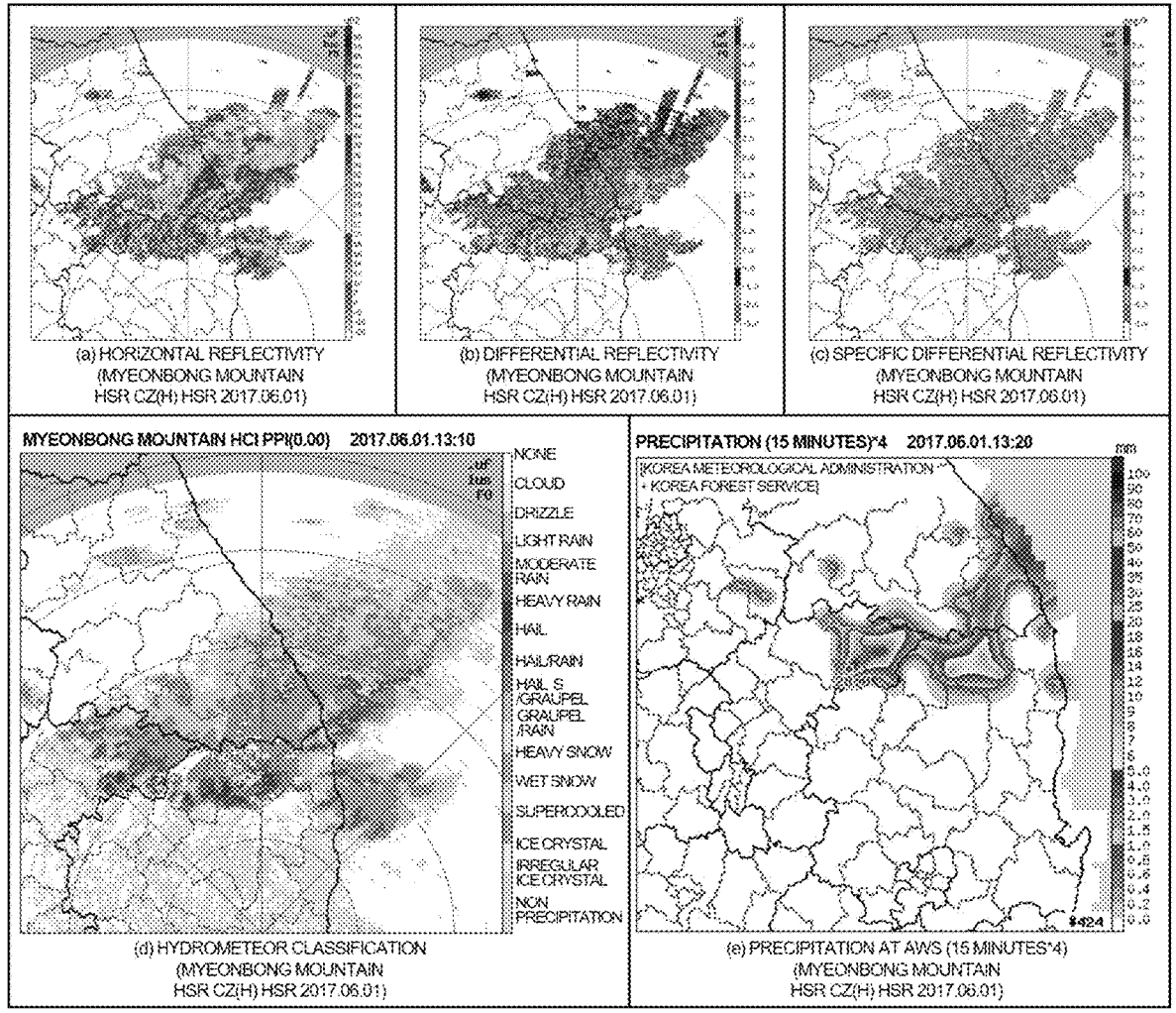
FIG. 8 is a diagram illustrating an image of probabilistic hydrometeor classification and an image of ground rainfall, using radar reflectivity, differential reflectivity, a specific differential phase observatory, or a dual-polarization variable from Mt. Myeonbong in a hail case of the north of Gyeongbuk Province on Jun. 1, 2017.

FIG. 8 is a diagram illustrating images of radar observatory, hydrometeors and ground rainfall in a hail case at Mt. Myeonbong at the north of Gyeongbuk Province on Jun. 1, 2017; and FIG. 9 is a diagram illustrating rainfall comparison images of rainfall estimation results of the related art and the invention.

In FIG. 8, (a) illustrates horizontal reflectivity $Z_H$, (b) illustrates differential reflectivity $Z_{DR}$, (c) illustrates specific differential phase $K_{DP}$, (d) illustrates represents hydrometeor classification, and (e) illustrates rainfall intensity (AWS precipitation (15 minutes×4)) observed on ground. At that point, the differential reflectivity $Z_{DR}$ is 0.5 dB or lower and has a low value in a part of a zone in which the horizontal reflectivity $Z_H$ having reflectivity of 950 dBZ or higher is very high. Consequently, hail particles are dominant in the corresponding zone, and thus it is possible to find that the horizontal reflectivity $Z_H$ is overly observed, and the hail particles are classified as hail or graupel hail similarly even on a hydrometeor classification image. Here, 15-minute accumulated intensity measured by a ground rain gauge is recorded to be 28 mm at the maximum extent and is not equal to that of a zone in which the horizontal reflectivity $Z_H$ is the maximum.

Figure 9:
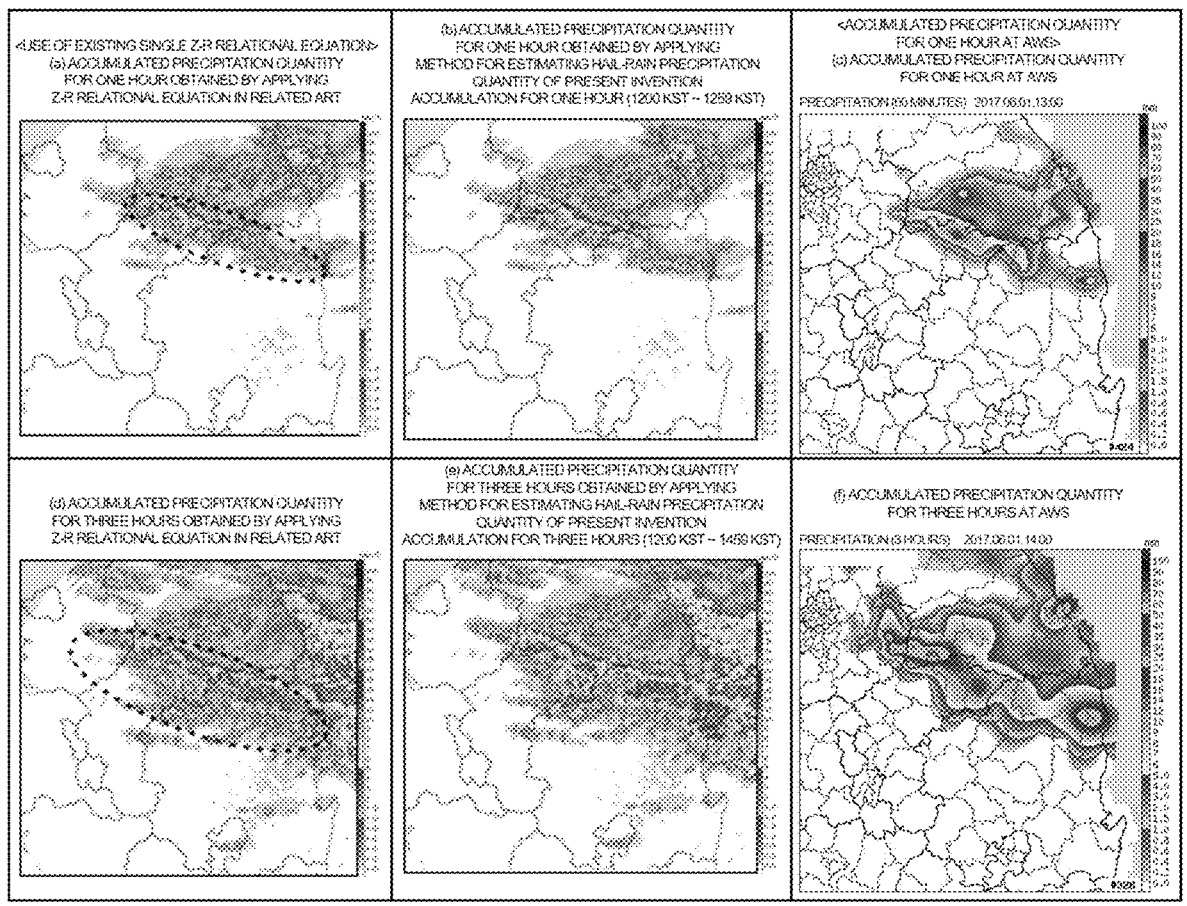
FIG. 9 is a diagram illustrating rainfall comparison images of rainfall estimating results of the related art and the invention.

FIG. 9 illustrates images of rainfall intensity estimated by a radar and a one-hour accumulated rainfall amount measured by a ground rain gauge, (a) illustrates an image of a one-hour accumulated rainfall amount obtained by applying the Z-R relational equation in the related art, (b) illustrates an image of a one-hour accumulated rainfall amount generated by applying the hail/rain rainfall estimating method of the invention, (c) illustrates an image of a one-hour accumulated rainfall amount (AWS one-hour accumulated rainfall amount) observed at the ground, (d) illustrates an image of a three-hour accumulated rainfall amount obtained by applying the Z-R relational equation in the related art, (e) illustrates an image of a three-hour accumulated rainfall amount generated by applying the hail/rain rainfall estimating method of the invention, and (f) illustrates an image of a three-hour accumulated rainfall amount (AWS three-hour accumulated rainfall amount) observed at the ground.

In a case of (a) of FIG. 9, in a hail zone which is indicated by results of rainfall estimation using a single Z-R relational equation (Z=200R$^{1.6}$) regardless of a type of hydrometeor (precipitation), when rainfall amounts of 35 mm and 50 mm or more at the maximum extent are estimated and compared to ground observed rainfall amounts of (c) and (f) of FIG. 9, when the rainfall amounts are accumulated for one hour ((a) of FIG. 9) and three hours ((d) of FIG. 9), the rainfall is found to be overestimated by twice an actual amount. On the other hand, in results ((b) and (e) of FIG. 9) of the invention of this application to which a compound relational equation applying technique is applied, the rainfall amounts obtained when accumulated for one hour and three hours are calculated to be 18 mm and 25 mm at the maximum extent as a very approximate value to the observed accumulated rainfall amount, and thereby accuracy of estimation of the rainfall amount is found to significantly improve.

The technical idea of the invention described above is specifically described in the preferred embodiments; however, attention needs to be paid to the following description. The embodiments are provided for the description and are not provided to limit the invention. In addition, it is possible for those of ordinary knowledge in the technical field of the invention to understand that various embodiments can be made within a range of the technical idea of the invention. Consequently, a true technical protection range needs to be set depending on the technical idea of the accompanying claims.

While the present invention has been described with respect to the specific embodiments, it will be apparent to those skilled in the art that various changes and modifications may be made without departing from the spirit and scope of the invention as defined in the following claims.

What is claimed is:

1. An apparatus for estimating rainfall of hail and rain, comprising:
    a dual-polarization weather radar configured to obtain observation information;
    an input unit configured to enable the observation information of the dual-polarization weather radar to be input, the observation information including information of horizontal reflectivity $Z_H$, differential reflectivity $Z_{DR}$, and specific differential phase $K_{DP}$;
    a storage unit configured to store information for estimating rainfall of hail and rain including the observation information;
    a hail/rain zone classifying unit configured to classify a hail zone, an entire rain zone, and a hail-rain mixed zone between the hail zone and the entire rain zone, based on zones and a mean distribution curve between the horizontal reflectivity $Z_H$ and the differential reflectivity $Z_{DR}$ derived from an observed raindrop size distribution, by using values of the horizontal reflectivity $Z_H$ and the differential reflectivity $Z_{DR}$ at respective observation points contained in the input observation information of the dual-polarization weather radar;
    a rainfall estimating unit configured to estimate rainfall intensity for each zone classified by the hail/rain zone classifying unit, by using the observation information of the horizontal reflectivity $Z_H$, the differential reflectivity $Z_{DR}$, and the specific differential phase $K_{DP}$; and
    an output unit configured to display, output, or transmit the observation information of the dual-polarization weather radar, results of zone classification of the hail/rain zone classifying unit, and information of the rainfall intensity estimated by the rainfall estimating unit,
    wherein the hail/rain zone classifying unit is configured to classify the entire rain zone into a differential reflectivity valid rain zone containing a main rain zone and a large-raindrop zone in which the differential reflectivity is valid in estimating the rainfall intensity and a differential reflectivity invalid rain zone containing a zone in which the differential reflectivity is out of a range of the main rain zone and the large-raindrop zone and is invalid in estimating the rainfall intensity and which is classified into a convective zone, a convective-stratiform transition zone, and a stratiform zone depending on reflectivity.

2. The apparatus for estimating rainfall of hail and rain according to claim 1,
    wherein the hail/rain zone classifying unit is configured to classify a zone as the main rain zone in which the differential reflectivity is usable, by setting a certain permissible width from points of the mean distribution curve between the horizontal reflectivity $Z_H$ and the differential reflectivity $Z_{DR}$ and classify the zone as the main rain zone by setting an upper limit obtained by increasing an amount by 15% to 25% of a value obtained by adding 0.2 dB to 0.4 dB to the curve and a lower limit obtained by decreasing an amount by 20% to 30% of a value obtained by subtracting 0.3 dB to 0.5 dB from the curve.

3. The apparatus for estimating rainfall of hail and rain according to claim 1,
    wherein the hail/rain zone classifying unit is configured to classify a zone as the large-raindrop zone in which the differential reflectivity is usable, by setting an upper limit of the large-raindrop zone by increasing an amount by 55% to 65% of a value obtained by adding 0.3 dB to 0.5 dB to a top of the main rain zone in order to consider large raindrops which are rain particles and have relatively high differential reflectivity.

4. The apparatus for estimating rainfall of hail and rain according to claim 1,
    wherein the hail/rain zone classifying unit is configured to classify, as the hail zone, a zone of the zones in which the horizontal reflectivity $Z_H$ is 40 dBZ or higher and the differential reflectivity $Z_{DR}$ is 0.3 or lower.

5. The apparatus for estimating rainfall of hail and rain according to claim 1,
    wherein the hail/rain zone classifying unit is configured to classify, as the hail-rain mixed zone in which hail and rain are mixed, a zone of the zones in which the horizontal reflectivity $Z_H$ is 40 dBZ or higher and the differential reflectivity $Z_{DR}$ is a value between an upper limit of the hail zone and a lower limit of the rain zone.

6. The apparatus for estimating rainfall of hail and rain according to claim 1,
    wherein the rainfall estimating unit is configured to estimate hail rainfall intensity of the hail zone, by $R(K_{DP})^{Hail}=\alpha K_{DP}^{\beta}$ ($10.0 \leq \alpha \leq 35.0$ and $0.5 \leq \beta \leq 0.8$), when the $K_{DP}$ (specific differential phase)$>0.1°$/km, and to estimate hail rainfall intensity of the hail-rain mixed zone, by $R(Z_H)^{Hail}=\alpha Z_H^{\beta}$ ($0.001 \leq \alpha \leq 0.3$ and $0.5 \leq \beta \leq 1.5$), when the $K_{DP}$ (specific differential phase)$\leq 0.1°$/km.

7. The apparatus for estimating rainfall of hail and rain according to claim 1,
    wherein the rainfall estimating unit is configured to estimate rainfall intensity $R^{Rain}$, that is, $R(K_{DP})^{Rain}$, of the entire rain zone, by $R(K_{DP})^{Rain}=\alpha K_{DP}\beta$ ($35.0 \leq \alpha \leq 75.0$ and $0.8 \leq \beta \leq 1.5$), when the $Z_H$ (horizontal reflectivity)$>35$ dB, and the specific differential phase $K_{DP}$ which is in a range of $K_{DP}$ (specific differential phase)$>0.3°$/km is applied such that estimation of the rainfall intensity is valid in the entire rain zone except the hail and hail-rain mixed zones.

8. The apparatus for estimating rainfall of hail and rain according to claim 1,
    wherein the rainfall estimating unit is configured to estimate rainfall intensity $R(Z_H, Z_{DR})^{Rain}$ of a differential reflectivity $Z_{DR}$ valid zone containing the main rain zone and the large-raindrop zone, by $R(Z_H, Z_{DR})^{Rain}=\alpha Z_H\beta 10^{0.1\gamma Z_{DR}}$ ($0.001 \leq \alpha \leq 0.3$, $0.5 \leq \beta \leq 1.2$, and $-3.0 \leq \gamma \leq 6.0$), when the specific differential phase $K_{DP}$ is invalid in estimating the rainfall intensity, but the differential reflectivity $Z_{DR}$ is valid to be applied thereto.

9. The apparatus for estimating rainfall of hail and rain according to claim 1,
   wherein the rainfall estimating unit is configured to set convective ($Z_H > 52$ dBZ) and stratiform ($Z_H < 30$ dBZ) zones depending on reflectivity, regarding a zone in which 30 dBZ $Z_H \leq 52$ dBZ as a convective-stratiform transition zone, in a differential reflectivity $Z_{DR}$ invalid rain zone (zone in which the $K_{DP}$ (specific differential phase)$\leq 0.3°/km$ and except the main rain zone and the large-raindrop zone) of a rainfall intensity estimation target zone in which the $K_{DP}$ (specific differential phase) and the $Z_{DR}$ (differential reflectivity) as dual-polarization variables are not usable, and estimate rainfall intensity $R_{ext}^{Rain}$ of the differential reflectivity invalid rain zone by obtaining a weighted mean of rainfall intensity of a convective rain zone and a stratiform rain zone, by $R_{ext}^{Rain} = R_{conv.}(Z_H)^{Rain} \times W_{conv}(Z_H) + R_{strt}(Z_H)^{Rain} \times W_{strt}(Z_H)$, $R_{ext}^{Rain}$ representing rainfall intensity of the differential reflectivity invalid rain zone in which the dual-polarization variables are not usable, $R_{conv.}(Z_H)^{Rain}$ being obtained by $\alpha Z_H^\beta$ ($0.001 \leq \alpha \leq 0.3$ and $0.6 \leq \beta \leq 1.1$) and representing rainfall intensity of the convective rain zone, $R_{strt}(Z_H)^{Rain}$ being obtained by $\alpha Z_H^\beta$ ($0.005 \leq \alpha \leq 0.5$ and $0.4 \leq \beta \leq 0.8$) and representing rainfall intensity of $$W_{conv.}\left(\left|\frac{|Z_H^{Obs.} - Z_H^{Strt.}|}{|Z_H^{Conv.} - Z_H^{Strt.}|}\right|\right)$$

the stratiform rain zone, representing a convective zone weight $$W_{strt.}\left(\frac{|Z_H^{Obs.} - Z_H^{Conv.}|}{|Z_H^{Conv.} - Z_H^{Strt.}|}\right)$$

value, and representing a stratiform zone weight value.

10. The apparatus for estimating rainfall of hail and rain according to claim 1,
    wherein the rainfall estimating unit estimates hail-rain mixed zone rainfall intensity of the hail-rain mixed zone in which observed horizontal reflectivity $Z_H$ is 40 dBZ or higher and observed differential reflectivity is between a lower limit of a main rain zone and an upper limit of the hail zone, by $R^{mix} = R(Z_H)^{Hail} \times W_{Hail}(Z_H) + R^{Rain} \times W_{Rain}(Z_{DR})$ as a weighted mean of entire rain zone rainfall intensity $R(K_{DP})^{Rain}$ f the entire rain zone and rainfall intensity ($R(K_{DP})^{Hail}$ or $R(Z_H)^{Hail}$) of the hail zone, with a weight value ($W_{Hail}(Z_H)$ or $W_{Rain}(Z_H)$) being set depending on a differential reflectivity $Z_{DR}$ value,
    wherein, depending on respective specific differential phase values, $R^{Hail}$ becomes $R(K_{DP})^{Hail}$ or $R(Z_H)^{Hail}$, and $R^{Rain}$ becomes $R(K_{DP})^{Rain}$ or $R_{ext}^{Rain}$, and $$\omega_{Hail} = \frac{|Z_{DR}^{Obs.} - Z_{DR}^{Rain}(Z_H^{Obs.})|}{|Z_{DR}^{Rain}(Z_H^{Obs.}) - Z_{DR}^{Hail}|}$$

wherein $W_{Hail}$ is obtained by as a weight value $$\omega_{Rain} = \frac{|Z_{DR}^{Obs.} - Z_{DR}^{Hail}|}{|Z_{DR}^{Rain}(Z_H^{Obs.}) - Z_{DR}^{Hail}|}$$

of the hail zone, and $W_{Rain}$ is obtained by as a weight value of the rain zone, $Z_H^{obs}$ representing observed horizontal reflectivity, $Z_{DR}^{obs}$ representing observed differential reflectivity, $Z_{DR}^{Rain}(Z_H^{obs.})$ representing a lower limit value of differential reflectivity $Z_{DR}$ of the main rain zone with respect to the observed horizontal reflectivity $Z_H^{obs.}$, and $Z_{DR}^{Hail}$ representing an upper limit value of differential reflectivity of the hail zone.

11. A method for estimating rainfall of hail and rain which is performed by an apparatus for estimating rainfall of hail and rain, the apparatus including a dual-polarization weather radar, an input unit, a storage unit, a hail/rain zone classifying unit, a rainfall estimating unit, and an output unit, the method comprising:
    obtaining observation information by the dual-polarization weather radar;
    enabling the observation information of the dual-polarization weather radar to be input by the input unit;
    storing information for estimating rainfall of hail and rain including the observation information by the storage unit;
    extracting observation values from the input observation information by the hail/rain zone classifying unit;
    classifying a hail/rain zone depending on a distribution of horizontal reflectivity $Z_H$ and differential reflectivity $Z_{DR}$ into a main rain zone and a large-raindrop zone in which differential reflectivity is usable, a hail zone, a hail-rain mixed zone, and a differential reflectivity invalid rain zone, by using information of the horizontal reflectivity $Z_H$ and the differential reflectivity $Z_{DR}$ of the extracted observation values, and classifying the differential reflectivity invalid rain zone into a convective zone, a stratiform zone, and a transition zone therebetween depending on reflection intensity, by the hail/rain zone classifying unit;
    estimating the rainfall intensity for each hail/rain zone, by using information of horizontal reflectivity $Z_H$, differential reflectivity $Z_{DR}$, and specific differential phase $K_{DP}$ observed for each zone classified in the step of classifying the hail/rain zone, by the rainfall estimating unit; and
    displaying, outputting, or transmitting the observation information of the dual-polarization weather radar, results of zone classification of the hail/rain zone classifying unit, and information of the rainfall intensity estimated by the rainfall estimating unit, by the output unit,
    wherein the step of classifying the hail/rain zone includes classifying, as the hail zone, a zone of the hail/rain zone in which the horizontal reflectivity $Z_H$ is 40 dBZ or higher and the differential reflectivity $Z_{DR}$ is 0.3 or lower, by the hail/rain zone classifying unit.

12. The method for estimating rainfall of hail and rain according to claim 11,
    wherein the step of classifying the hail/rain zone includes classifying, as the hail-rain mixed zone in which hail and rain are mixed, a zone of the hail/rain zone in which the horizontal reflectivity $Z_H$ is 40 dBZ or higher and the differential reflectivity $Z_{DR}$ is a value between an upper limit of the hail zone and a lower limit of the rain zone, by the hail/rain zone classifying unit.

13. The method for estimating rainfall of hail and rain according to claim 11,
    wherein the step of classifying the hail/rain zone includes classifying a zone as a main rain zone by setting an upper limit obtained by increasing an amount by 15% to 25% of a value obtained by adding 0.2 dB to 0.4 dB to points of a mean distribution curve between the horizontal reflectivity $Z_H$ and the differential reflectivity $Z_{DR}$ derived from data of observed drop size distribution (DSD) and a lower limit obtained by decreasing an amount by 20% to 30% of a value obtained by subtracting 0.3 dB to 0.5 dB from the points thereof, by the hail/rain zone classifying unit.

14. The method for estimating rainfall of hail and rain according to claim 11,
    wherein the step of classifying the hail/rain zone includes classifying a zone as a large-raindrop zone in which the differential reflectivity is usable by setting an upper limit (increase by 60% of a value obtained by adding 0.4 dB to the curve) of the large-raindrop zone at a top of a main rain zone in order to consider large raindrops which are rain particles having a relatively large diameter and have relatively high differential reflectivity, by the hail/rain zone classifying unit.

15. The method for estimating rainfall of hail and rain according to claim 11,
    wherein the step of estimating the rainfall intensity includes estimating rainfall intensity $R(K_{DP})^{Rain}$ of the entire rain zone, by $R(K_{DP})^{Rain} = \alpha K_{DP}^{\beta}$ ($35.0 \leq \alpha \leq 75.0$ and $0.8 \leq \beta \leq 1.5$), when the $Z_H$ (horizontal reflectivity)>35 dB, and the $K_{DP}$ (specific differential phase)>0.3°/km, by the rainfall estimating unit.

16. The method for estimating rainfall of hail and rain according to claim 11,
    wherein the step of estimating the rainfall intensity includes estimating, by $R(Z_H, Z_{DR})^{Rain} = \alpha Z_H^{\beta} 10^{0.1\gamma Z_{DR}}$ ($0.001 \leq \alpha \leq 0.3$, $0.5 \leq \beta \leq 1.2$, and $-3.0 \leq \gamma \leq 6.0$), rainfall intensity $R(Z_H, Z_{DR})^{Rain}$ of a differential reflectivity $Z_{DR}$ valid zone of a main rain zone and a large-raindrop zone which are $Z_{DR}$ (differential reflectivity) valid zones of a zone in which the horizontal reflectivity $Z_H$ is lower than 35 dBZ or $K_{DP}$ is lower than 0.3°/km without satisfying a condition for using the $K_{DP}$ (specific differential phase).

17. The method for estimating rainfall of hail and rain according to claim 11,
    wherein the step of estimating the rainfall intensity includes estimating differential reflectivity invalid rain zone rainfall intensity $R_{ext}^{Rain}$ of the differential reflectivity invalid rain zone of the entire rain zone in which the $Z_{DR}$ (differential reflectivity) and the $K_{DP}$ (specific differential phase) as dual-polarization variables are not usable and which is out of a main rain zone and a large-raindrop zone, by $R_{ext}^{Rain} = R_{conv.}(Z_H)^{Rain} \lambda W_{conv.}(Z_H) R_{strt.}(Z_H)^{Rain} \lambda W_{strt.}(Z_H)$, and
    wherein $R_{ext}^{Rain}$ represents rainfall intensity of the differential reflectivity $Z_{DR}$ invalid rain zone in which the dual-polarization variables are not usable, $R_{conv.}(Z_H)^{Rain}$ is $\alpha Z_H^{\beta}$ ($0.001 \leq \alpha \leq 0.3$ and $0.6 \leq \beta \leq 1.1$) and represents rainfall intensity of convective rain, $R_{strt.}(Z_H)^{Rain}$ is $\alpha Z_H^{\beta}$ ($0.005 \leq \alpha \leq 0.5$ and $0.4 \leq \beta \leq 0.8$) and represents rainfall intensity of stratiform rain, $$W_{conv.}\left(\left|\frac{|Z_H^{Obs.} - Z_H^{Strt.}|}{|Z_H^{Conv.} - Z_H^{Strt.}|}\right|\right)$$

represents a convective zone weight value, and $$W_{strt.}\left(\left|\frac{|Z_H^{Obs.} - Z_H^{Conv.}|}{|Z_H^{Conv.} - Z_H^{Strt.}|}\right|\right)$$

represents a stratiform zone weight value, $Z_H^{obs}$ representing observed horizontal reflectivity, $Z_H^{Strt.}$ representing an upper limit value of horizontal reflectivity of a stratiform rain zone, and $Z_H^{Conv.}$ representing a lower limit value of horizontal reflectivity of a convective rain zone.

18. The method for estimating rainfall of hail and rain according to claim 11,
    wherein the step of estimating the rainfall intensity includes estimating, with respect to the hail zone in which the horizontal reflectivity $Z_H$ is 40 dBZ or higher, and the differential reflectivity $Z_{DR}$ is 0.3 or lower, hail rainfall intensity of the hail zone, by $R(K_{DP})^{Hail} = \alpha K_{DP}^{\beta}$ ($10.0 \leq \alpha \leq 35.0$ and $0.5 \leq \beta \leq 0.8$), when $K_{DP}$ (specific differential phase)>0.1°/km, and estimate hail rainfall intensity of the hail-rain mixed zone by $R(Z_H)^{Hail} = \alpha Z_H^{\beta}$ ($0.001 \leq \alpha \leq 0.3$ and $0.5 \leq \beta \leq 1.5$), when $K_{DP}$ (specific differential phase)$\leq 0.1$°/km, by the rainfall estimating unit.

19. The method for estimating rainfall of hail and rain according to claim 11,
    wherein the step of estimating the rainfall intensity includes estimating hail-rain mixed zone rainfall intensity of the hail-rain mixed zone in which observed horizontal reflectivity $Z_H$ is 40 dBZ or higher and observed differential reflectivity is between a lower limit of a main rain zone and an upper limit of the hail zone, by $R^{mix} = R(Z_H)^{Hail} \times W_{Hail}(Z_H) + R^{Rain} \times W_{Rain}(Z_{DR})$ as a weighted mean of entire rain zone rainfall intensity $R(K_{DP})^{Rain}$ of the entire rain zone and rainfall intensity of the hail zone, by calculating weight values ($W_{Hail}(Z_H)$ and $W_{Rain}(Z_H)$) depending on a differential reflectivity $Z_{DR}$ value, by the rainfall estimating unit,
    wherein, depending on respective specific differential phase values, $R^{Hail}$ becomes $R(K_{DP})^{Hail}$ or $R(Z_H)^{Hail}$, and $R^{Rain}$ becomes $R(K_{DP})^{Rain}$ or $R_{ext}^{Rain}$, and $$\frac{|Z_{DR}^{Obs.} - Z_{DR}^{Rain}(Z_H^{Obs.})|}{|Z_{DR}^{Rain}(Z_H^{Obs.}) - Z_{DR}^{Hail}|}$$

wherein $W_{Hail}(Z_H)$ is obtained by as a weight value of $$\frac{|Z_{DR}^{Obs.} - Z_{DR}^{Hail}|}{|Z_{DR}^{Rain}(Z_H^{Obs.}) - Z_{DR}^{Hail}|}$$

hail of the hail-rain mixed zone, and $W_{Rain}(Z_{DR})$ is obtained by as a weight value of rain of the hail-rain mixed zone, here, $Z_H^{obs}$ representing observed horizontal reflectivity, $Z_{DR}^{obs.}$ representing observed differential reflectivity, $Z_{DR}^{Rain}(z_H^{obs.})$ representing a lower limit value of differential reflectivity $Z_{DR}$ of the main rain zone with respect to the observed horizontal reflectivity $Z_H^{obs}$ and $Z_{DR}^{Hail}$ representing an upper limit value of differential reflectivity of the hail zone.

\* \* \* \* \*